United States Patent
Abdallah et al.

(10) Patent No.: US 10,740,126 B2
(45) Date of Patent: *Aug. 11, 2020

(54) METHODS, SYSTEMS AND APPARATUS FOR SUPPORTING WIDE AND EFFICIENT FRONT-END OPERATION WITH GUEST-ARCHITECTURE EMULATION

(71) Applicant: Intel Corporation, Santa Clara, CA (US)

(72) Inventors: Mohammad Abdallah, Folsom, CA (US); Ankur Groen, Santa Clara, CA (US); Erika Gunadi, Los Gatos, CA (US); Mandeep Singh, Union City, CA (US); Ravishankar Rao, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,010

(22) Filed: Oct. 19, 2018

(65) Prior Publication Data
US 2019/0056964 A1    Feb. 21, 2019

Related U.S. Application Data

(63) Continuation of application No. 14/216,493, filed on Mar. 17, 2014, now Pat. No. 10,140,138.
(Continued)

(51) Int. Cl.
*G06F 9/32* (2018.01)
*G06F 12/08* (2016.01)
(Continued)

(52) U.S. Cl.
CPC ...... *G06F 9/45545* (2013.01); *G06F 9/30058* (2013.01); *G06F 9/30065* (2013.01);
(Continued)

(58) Field of Classification Search
CPC ............ G06F 9/45545; G06F 9/30058; G06F 9/30065; G06F 9/30174; G06F 9/325;
(Continued)

(56) References Cited

U.S. PATENT DOCUMENTS

| 727,487 A | 5/1903 | Swan |
|---|---|---|
| 4,075,704 A | 2/1978 | O'Leary |

(Continued)

FOREIGN PATENT DOCUMENTS

| CN | 1214666 A | 4/1999 |
|---|---|---|
| CN | 1305150 A | 7/2001 |

(Continued)

OTHER PUBLICATIONS

Communication pursuant to Article 94(3) EPC for Application No. 12174229.0, dated Dec. 20, 2018, 5 pages.
(Continued)

*Primary Examiner* — Daniel H Pan
(74) *Attorney, Agent, or Firm* — NDWE LLP

(57) ABSTRACT

Methods for supporting wide and efficient front-end operation with guest architecture emulation are disclosed. As a part of a method for supporting wide and efficient front-end operation, upon receiving a request to fetch a first far taken branch instruction, a cache line that includes the first far taken branch instruction, a next cache line and a cache line located at the target of the first far taken branch instruction is read. Based on information that is accessed from a data table, the cache line and either the next cache line or the cache line located at the target is fetched in a single cycle.

17 Claims, 16 Drawing Sheets

Related U.S. Application Data

(60) Provisional application No. 61/799,717, filed on Mar. 15, 2013.

(51) Int. Cl.

| | | |
|---|---|---|
| *G06F 9/455* | (2018.01) | |
| *G06F 12/0875* | (2016.01) | |
| *G06F 12/1027* | (2016.01) | |
| *G06F 9/30* | (2018.01) | |
| *G06F 12/1036* | (2016.01) | |
| *G06F 9/38* | (2018.01) | |

(52) U.S. Cl.
CPC .......... *G06F 9/30174* (2013.01); *G06F 9/325* (2013.01); *G06F 9/3806* (2013.01); *G06F 9/45554* (2013.01); *G06F 12/0875* (2013.01); *G06F 12/1027* (2013.01); *G06F 12/1036* (2013.01); *G06F 9/3808* (2013.01)

(58) Field of Classification Search
CPC .. G06F 9/3806; G06F 9/45554; G06F 9/3808; G06F 9/324; G06F 9/3455; G06F 9/35; G06F 9/355; G06F 9/35355; G06F 9/3557; G06F 12/0875; G06F 12/1027; G06F 12/1036; G06F 12/109; G06F 12/0897; G06F 12/0811; G06F 12/0862
USPC ......... 712/205–207, 233–240; 711/122, 133, 711/207, 213
See application file for complete search history.

(56) References Cited

U.S. PATENT DOCUMENTS

| | | |
|---|---|---|
| 4,245,344 A | 1/1981 | Richter |
| 4,356,550 A | 10/1982 | Katzman et al. |
| 4,414,624 A | 11/1983 | Summer, Jr. et al. |
| 4,524,415 A | 6/1985 | Mills, Jr. et al. |
| 4,527,237 A | 7/1985 | Frieder et al. |
| 4,577,273 A | 3/1986 | Hopper et al. |
| 4,597,061 A | 6/1986 | Cline et al. |
| 4,600,986 A | 7/1986 | Scheuneman et al. |
| 4,633,434 A | 12/1986 | Scheuneman |
| 4,682,281 A | 7/1987 | Woffinden et al. |
| 4,727,487 A | 2/1988 | Masui et al. |
| 4,816,991 A | 3/1989 | Watanabe et al. |
| 4,835,680 A | 5/1989 | Hogg et al. |
| 4,920,477 A | 4/1990 | Colwell et al. |
| 4,930,066 A | 5/1990 | Yokota |
| 4,943,909 A | 7/1990 | Huang |
| 5,197,130 A | 3/1993 | Chen et al. |
| 5,294,897 A | 3/1994 | Notani et al. |
| 5,317,705 A | 5/1994 | Gannon et al. |
| 5,317,754 A | 5/1994 | Blandy et al. |
| 5,339,398 A | 8/1994 | Shah et al. |
| 5,404,470 A | 4/1995 | Miyake |
| 5,469,376 A | 11/1995 | Abdallah |
| 5,471,593 A | 11/1995 | Branigin |
| 5,488,730 A | 1/1996 | Brown et al. |
| 5,509,130 A | 4/1996 | Trauben et al. |
| 5,517,651 A | 5/1996 | Huck et al. |
| 5,524,090 A | 6/1996 | Iwamura |
| 5,548,742 A | 8/1996 | Wang et al. |
| 5,559,986 A | 9/1996 | Alpert et al. |
| 5,574,878 A | 11/1996 | Onodera et al. |
| 5,581,725 A | 12/1996 | Nakayama |
| 5,590,084 A | 12/1996 | Miyano et al. |
| 5,634,068 A | 5/1997 | Nishtala et al. |
| 5,649,136 A | 7/1997 | Shen et al. |
| 5,675,759 A | 10/1997 | Shebanow et al. |
| 5,699,537 A | 12/1997 | Sharangpani et al. |
| 5,710,902 A | 1/1998 | Sheaffer et al. |
| 5,724,565 A | 3/1998 | Dubey et al. |
| 5,751,982 A | 5/1998 | Morley |
| 5,752,260 A | 5/1998 | Liu |
| 5,754,818 A | 5/1998 | Mohamed |
| 5,761,476 A | 6/1998 | Martell |
| 5,787,494 A | 7/1998 | Delano et al. |
| 5,793,941 A | 8/1998 | Pencis et al. |
| 5,802,602 A | 9/1998 | Rahman et al. |
| 5,806,085 A | 9/1998 | Berliner |
| 5,813,031 A | 9/1998 | Chou et al. |
| 5,819,088 A | 10/1998 | Reinders |
| 5,829,028 A | 10/1998 | Lynch et al. |
| 5,835,951 A | 11/1998 | McMahan |
| 5,852,738 A | 12/1998 | Bealkowski et al. |
| 5,860,146 A | 1/1999 | Vishin et al. |
| 5,864,657 A | 1/1999 | Stiffler |
| 5,872,985 A | 2/1999 | Kimura |
| 5,881,277 A | 3/1999 | Bondi et al. |
| 5,901,294 A | 5/1999 | Tran et al. |
| 5,903,750 A | 5/1999 | Yeh et al. |
| 5,905,509 A | 5/1999 | Jones et al. |
| 5,911,057 A | 6/1999 | Shiell |
| 5,918,251 A | 6/1999 | Yamada et al. |
| 5,956,753 A | 9/1999 | Glew et al. |
| 5,974,506 A | 10/1999 | Sicola et al. |
| 5,978,906 A | 11/1999 | Tran |
| 5,983,327 A | 11/1999 | Achilles et al. |
| 6,016,533 A | 1/2000 | Tran |
| 6,016,540 A | 1/2000 | Zaidi et al. |
| 6,021,484 A | 2/2000 | Park |
| 6,065,105 A | 5/2000 | Zaidi et al. |
| 6,073,230 A | 6/2000 | Pickett et al. |
| 6,075,938 A | 6/2000 | Bugnion et al. |
| 6,085,315 A | 7/2000 | Fleck et al. |
| 6,088,780 A | 7/2000 | Yamada et al. |
| 6,092,172 A | 7/2000 | Nishimoto et al. |
| 6,101,577 A | 8/2000 | Tran |
| 6,108,769 A | 8/2000 | Chinnakonda et al. |
| 6,115,809 A | 9/2000 | Mattson, Jr. et al. |
| 6,134,634 A | 10/2000 | Marshall, Jr. et al. |
| 6,138,226 A | 10/2000 | Yoshioka et al. |
| 6,157,998 A | 12/2000 | Rupley, II et al. |
| 6,167,490 A | 12/2000 | Levy et al. |
| 6,170,051 B1 | 1/2001 | Dowling |
| 6,178,482 B1 | 1/2001 | Sollars |
| 6,185,660 B1 | 2/2001 | Mulla et al. |
| 6,205,545 B1 | 3/2001 | Shah et al. |
| 6,209,085 B1 | 3/2001 | Hammond et al. |
| 6,212,542 B1 | 4/2001 | Kahle et al. |
| 6,212,613 B1 | 4/2001 | Belair |
| 6,216,215 B1 | 4/2001 | Palanca et al. |
| 6,226,732 B1 | 5/2001 | Pei et al. |
| 6,247,097 B1 | 6/2001 | Sinharoy |
| 6,253,316 B1 | 6/2001 | Tran et al. |
| 6,256,727 B1 | 7/2001 | McDonald |
| 6,256,728 B1 | 7/2001 | Witt et al. |
| 6,260,131 B1 | 7/2001 | Kikuta et al. |
| 6,260,138 B1 | 7/2001 | Harris |
| 6,269,439 B1 | 7/2001 | Hanaki |
| 6,272,616 B1 | 8/2001 | Fernando et al. |
| 6,272,662 B1 | 8/2001 | Jadav et al. |
| 6,275,917 B1 | 8/2001 | Okada |
| 6,282,583 B1 | 8/2001 | Pincus et al. |
| 6,282,638 B1 | 8/2001 | Dowling |
| 6,308,323 B1 | 10/2001 | Douniwa |
| 6,321,298 B1 | 11/2001 | Hubis |
| 6,327,650 B1 | 12/2001 | Bapst et al. |
| 6,332,189 B1 | 12/2001 | Baweja et al. |
| 6,339,822 B1 | 1/2002 | Miller |
| 6,341,324 B1 | 1/2002 | Caulk, Jr. et al. |
| 6,345,357 B1 | 2/2002 | Sato |
| 6,360,311 B1 | 3/2002 | Zandveld et al. |
| 6,408,367 B2 | 6/2002 | Achilles et al. |
| 6,437,789 B1 | 8/2002 | Tidwell et al. |
| 6,449,671 B1 | 9/2002 | Patkar et al. |
| 6,457,120 B1 | 9/2002 | Sinharoy |
| 6,473,833 B1 | 10/2002 | Arimilli et al. |
| 6,490,673 B1 | 12/2002 | Heishi et al. |
| 6,502,187 B1 | 12/2002 | Miyagawa |
| 6,529,928 B1 | 3/2003 | Resnick et al. |
| 6,542,984 B1 | 4/2003 | Keller et al. |

(56) References Cited

U.S. PATENT DOCUMENTS

| | | |
|---|---|---|
| 6,557,083 B1 | 4/2003 | Sperber et al. |
| 6,557,095 B1 | 4/2003 | Henstrom |
| 6,594,755 B1 | 7/2003 | Nuechterlein et al. |
| 6,604,187 B1 | 8/2003 | McGrath et al. |
| 6,609,189 B1 | 8/2003 | Kuszmaul et al. |
| 6,615,340 B1 | 9/2003 | Wilmot, II |
| 6,658,447 B2 | 12/2003 | Cota-Robles |
| 6,658,549 B2 | 12/2003 | Wilson et al. |
| 6,668,316 B1 | 12/2003 | Gorshtein et al. |
| 6,681,395 B1 | 1/2004 | Nishi |
| 6,704,860 B1 | 3/2004 | Moore |
| 6,721,874 B1 | 4/2004 | Le et al. |
| 6,728,866 B1 | 4/2004 | Kahle et al. |
| 6,775,761 B2 | 8/2004 | Wang et al. |
| 6,829,698 B2 | 12/2004 | Arimilli et al. |
| 6,850,531 B1 | 2/2005 | Rao et al. |
| 6,882,177 B1 | 4/2005 | Reddy et al. |
| 6,907,600 B2 | 6/2005 | Neiger et al. |
| 6,912,644 B1 | 6/2005 | O'Connor et al. |
| 6,920,530 B2 | 7/2005 | Musumeci |
| 6,944,744 B2 | 9/2005 | Ahmed et al. |
| 6,948,172 B1 | 9/2005 | D'Souza |
| 6,950,927 B1 | 9/2005 | Apisdorf et al. |
| 6,954,846 B2 | 10/2005 | Leibholz et al. |
| 6,985,591 B2 | 1/2006 | Graunke |
| 6,988,183 B1 | 1/2006 | Wong |
| 7,007,108 B2 | 2/2006 | Emerson et al. |
| 7,020,879 B1 | 3/2006 | Nemirovsky et al. |
| 7,047,322 B1 | 5/2006 | Bauman et al. |
| 7,111,145 B1 | 9/2006 | Chen et al. |
| 7,117,347 B2 | 10/2006 | Col et al. |
| 7,139,855 B2 | 11/2006 | Armstrong et al. |
| 7,143,273 B2 | 11/2006 | Miller et al. |
| 7,149,872 B2 | 12/2006 | Rozas et al. |
| 7,150,021 B1 | 12/2006 | Vajjhala et al. |
| 7,171,535 B2 | 1/2007 | Naoi |
| 7,203,824 B2 | 4/2007 | Bean et al. |
| 7,206,925 B1 | 4/2007 | Jacobson et al. |
| 7,213,106 B1 | 5/2007 | Koster et al. |
| 7,213,248 B2 | 5/2007 | Arimilli et al. |
| 7,231,106 B2 | 6/2007 | Basavanhally et al. |
| 7,257,695 B2 | 8/2007 | Jiang et al. |
| 7,278,030 B1 | 10/2007 | Chen et al. |
| 7,284,092 B2 | 10/2007 | Nunamaker et al. |
| 7,290,261 B2 | 10/2007 | Burky et al. |
| 7,313,775 B2 | 12/2007 | Casey et al. |
| 7,331,040 B2 | 2/2008 | Sandham et al. |
| 7,343,476 B2 | 3/2008 | Floyd et al. |
| 7,373,637 B2 | 5/2008 | Dewitt et al. |
| 7,380,096 B1 | 5/2008 | Rozas et al. |
| 7,383,427 B2 | 6/2008 | Yamazaki |
| 7,398,347 B1 | 7/2008 | Pechanek et al. |
| 7,406,581 B2 | 7/2008 | Southwell et al. |
| 7,418,579 B2 | 8/2008 | Guibert et al. |
| 7,418,582 B1 | 8/2008 | Iacobovici et al. |
| 7,441,110 B1 | 10/2008 | Puzak et al. |
| 7,493,475 B2 | 2/2009 | Colavin |
| 7,539,879 B2 | 5/2009 | Terechko et al. |
| 7,546,420 B1 | 6/2009 | Shar et al. |
| 7,577,820 B1 | 8/2009 | Wentzlaff et al. |
| 7,613,131 B2 | 11/2009 | Decasper et al. |
| 7,617,384 B1 | 11/2009 | Coon et al. |
| 7,627,735 B2 | 12/2009 | Espasa et al. |
| 7,634,637 B1 | 12/2009 | Lindholm et al. |
| 7,647,483 B2 | 1/2010 | Bates et al. |
| 7,680,988 B1 | 3/2010 | Nickolls et al. |
| 7,681,019 B1 | 3/2010 | Favor |
| 7,707,397 B2 | 4/2010 | Henry et al. |
| 7,707,578 B1 | 4/2010 | Zedlewski et al. |
| 7,711,929 B2 | 5/2010 | Burky et al. |
| 7,716,460 B2 | 5/2010 | Stempel et al. |
| 7,743,238 B2 | 6/2010 | Biles |
| 7,757,065 B1 | 7/2010 | Jourdan et al. |
| 7,770,161 B2 | 8/2010 | Mitran et al. |
| 7,783,868 B2 | 8/2010 | Ukai |
| 7,783,869 B2 | 8/2010 | Grandou et al. |
| 7,809,925 B2 | 10/2010 | Mejdrich et al. |
| 7,848,129 B1 | 12/2010 | Deshpande et al. |
| 7,856,530 B1 | 12/2010 | Mu |
| 7,861,055 B2 | 12/2010 | Pong |
| 7,861,060 B1 | 12/2010 | Nickolls et al. |
| 7,877,582 B2 | 1/2011 | Gschwind et al. |
| 7,913,058 B2 | 3/2011 | Rozas et al. |
| 7,925,869 B2 | 4/2011 | Kelsey et al. |
| 8,044,951 B1 | 10/2011 | Brown et al. |
| 8,046,775 B2 | 10/2011 | Kang et al. |
| 8,082,420 B2 | 12/2011 | Comparan et al. |
| 8,108,545 B2 | 1/2012 | Arimilli et al. |
| 8,108,625 B1 | 1/2012 | Coon et al. |
| 8,145,844 B2 | 3/2012 | Bruce |
| 8,145,880 B1 | 3/2012 | Cismas et al. |
| 8,145,882 B1 | 3/2012 | Kishore et al. |
| 8,200,949 B1 | 6/2012 | Tarjan et al. |
| 8,219,996 B1 | 7/2012 | Morris |
| 8,230,423 B2 | 7/2012 | Frigo et al. |
| 8,239,656 B2 | 8/2012 | Rozas et al. |
| 8,301,847 B2 | 10/2012 | Dantzig et al. |
| 8,316,435 B1 | 11/2012 | Varadhan et al. |
| 8,327,115 B2 | 12/2012 | Abdallah |
| 8,438,366 B2 | 5/2013 | Akizuki et al. |
| 8,522,253 B1 | 8/2013 | Rozas et al. |
| 8,539,486 B2 | 9/2013 | Cain, III et al. |
| 8,645,965 B2 | 2/2014 | Zimmer et al. |
| 8,756,329 B2 | 6/2014 | Reynolds et al. |
| 8,868,838 B1 | 10/2014 | Glasco et al. |
| 8,930,674 B2 | 1/2015 | Avudaiyappan et al. |
| 9,021,240 B2 * | 4/2015 | Alexander ............ G06F 9/3804 712/239 |
| 9,047,178 B2 | 6/2015 | Talagala et al. |
| 9,135,003 B2 | 9/2015 | Suh et al. |
| 9,208,066 B1 | 12/2015 | Mizrahi et al. |
| 9,575,762 B2 | 2/2017 | Abdallah |
| 9,811,342 B2 | 11/2017 | Abdallah et al. |
| 9,811,377 B2 | 11/2017 | Abdallah et al. |
| 9,823,930 B2 | 11/2017 | Abdallah et al. |
| 9,858,080 B2 | 1/2018 | Abdallah |
| 10,140,138 B2 * | 11/2018 | Abdallah ............ G06F 9/45545 |
| 10,198,266 B2 | 2/2019 | Abdallah |
| 2001/0004755 A1 | 6/2001 | Levy et al. |
| 2001/0016901 A1 | 8/2001 | Topham |
| 2001/0032303 A1 | 10/2001 | Pechanek et al. |
| 2001/0049782 A1 | 12/2001 | Hsu et al. |
| 2002/0029308 A1 | 3/2002 | Babaian et al. |
| 2002/0062435 A1 | 5/2002 | Nemirovsky et al. |
| 2002/0069326 A1 | 6/2002 | Richardson et al. |
| 2002/0082824 A1 | 6/2002 | Neiger et al. |
| 2002/0083312 A1 | 6/2002 | Sinharoy |
| 2002/0099913 A1 | 7/2002 | Steely et al. |
| 2002/0125585 A1 | 9/2002 | Slamowitz et al. |
| 2002/0126657 A1 | 9/2002 | Frouin et al. |
| 2002/0129085 A1 | 9/2002 | Kubala et al. |
| 2002/0174321 A1 | 11/2002 | John et al. |
| 2002/0188833 A1 | 12/2002 | Henry et al. |
| 2003/0035422 A1 | 2/2003 | Hill |
| 2003/0065887 A1 | 4/2003 | Maiyuran et al. |
| 2003/0088752 A1 | 5/2003 | Harman |
| 2003/0093776 A1 | 5/2003 | Hilton |
| 2003/0101322 A1 | 5/2003 | Gardner |
| 2003/0101444 A1 | 5/2003 | Wu et al. |
| 2003/0126408 A1 | 7/2003 | Vajapeyam et al. |
| 2003/0131335 A1 | 7/2003 | Hamlin |
| 2003/0149862 A1 | 8/2003 | Kadambi |
| 2003/0154363 A1 | 8/2003 | Soltis et al. |
| 2003/0163642 A1 | 8/2003 | Borkenhagen et al. |
| 2003/0169626 A1 | 9/2003 | Burk et al. |
| 2003/0200396 A1 | 10/2003 | Musumeci |
| 2003/0200412 A1 | 10/2003 | Peinado et al. |
| 2003/0202530 A1 | 10/2003 | Jenkins et al. |
| 2003/0208660 A1 | 11/2003 | Van De Waerdt |
| 2003/0225938 A1 | 12/2003 | Glasco et al. |
| 2003/0226001 A1 | 12/2003 | Moyer et al. |
| 2003/0229864 A1 | 12/2003 | Watkins |
| 2003/0233394 A1 | 12/2003 | Rudd et al. |
| 2004/0034762 A1 | 2/2004 | Kacevas |

(56) References Cited

U.S. PATENT DOCUMENTS

| | | |
|---|---|---|
| 2004/0044850 A1 | 3/2004 | George et al. |
| 2004/0064668 A1 | 4/2004 | Kjos et al. |
| 2004/0073909 A1 | 4/2004 | Arimilli et al. |
| 2004/0078538 A1 | 4/2004 | Dutt et al. |
| 2004/0093483 A1 | 5/2004 | Nguyen et al. |
| 2004/0098567 A1 | 5/2004 | Hansen et al. |
| 2004/0103251 A1 | 5/2004 | Alsup |
| 2004/0117593 A1 | 6/2004 | Uhlig et al. |
| 2004/0117594 A1 | 6/2004 | Vanderspek |
| 2004/0122887 A1 | 6/2004 | Macy |
| 2004/0138857 A1 | 7/2004 | Souza et al. |
| 2004/0139441 A1 | 7/2004 | Kaburaki et al. |
| 2004/0143727 A1 | 7/2004 | McDonald |
| 2004/0158822 A1 | 8/2004 | Sandham et al. |
| 2004/0172523 A1 | 9/2004 | Merchant et al. |
| 2004/0187123 A1 | 9/2004 | Tremblay et al. |
| 2004/0193857 A1 | 9/2004 | Miller et al. |
| 2004/0202158 A1 | 10/2004 | Takeno et al. |
| 2004/0205296 A1 | 10/2004 | Bearden |
| 2004/0215886 A1 | 10/2004 | Cargnoni et al. |
| 2004/0216105 A1 | 10/2004 | Burky et al. |
| 2004/0216120 A1 | 10/2004 | Burky et al. |
| 2004/0225872 A1 | 11/2004 | Bonanno et al. |
| 2005/0005085 A1 | 1/2005 | Miyanaga |
| 2005/0027961 A1 | 2/2005 | Zhang |
| 2005/0044547 A1 | 2/2005 | Gipp |
| 2005/0055504 A1 | 3/2005 | Hass et al. |
| 2005/0060457 A1 | 3/2005 | Olukotun |
| 2005/0066131 A1 | 3/2005 | Biles et al. |
| 2005/0108480 A1 | 5/2005 | Correale, Jr. et al. |
| 2005/0108715 A1 | 5/2005 | Kanai et al. |
| 2005/0114603 A1 | 5/2005 | Buti et al. |
| 2005/0120191 A1 | 6/2005 | Akkary et al. |
| 2005/0120194 A1 | 6/2005 | Kissell |
| 2005/0132145 A1 | 6/2005 | Dybsetter et al. |
| 2005/0154867 A1 | 7/2005 | Dewitt et al. |
| 2005/0204118 A1 | 9/2005 | Jen et al. |
| 2005/0210457 A1 | 9/2005 | Guilford |
| 2005/0216920 A1 | 9/2005 | Tewari et al. |
| 2005/0251639 A1 | 11/2005 | Vishin et al. |
| 2005/0251649 A1 | 11/2005 | Yamazaki |
| 2005/0262270 A1 | 11/2005 | Latorre et al. |
| 2005/0289299 A1 | 12/2005 | Nunamaker et al. |
| 2005/0289530 A1 | 12/2005 | Robison |
| 2006/0004964 A1 | 1/2006 | Conti et al. |
| 2006/0026381 A1 | 2/2006 | Doi et al. |
| 2006/0026408 A1 | 2/2006 | Morris et al. |
| 2006/0036516 A1 | 2/2006 | Glebe |
| 2006/0080380 A1 | 4/2006 | Aizu et al. |
| 2006/0094446 A1 | 5/2006 | Duan |
| 2006/0095720 A1 | 5/2006 | Biles et al. |
| 2006/0143390 A1 | 6/2006 | Kottapalli |
| 2006/0161421 A1 | 7/2006 | Kissell |
| 2006/0161921 A1 | 7/2006 | Kissell |
| 2006/0179257 A1 | 8/2006 | Chu et al. |
| 2006/0179277 A1 | 8/2006 | Flachs et al. |
| 2006/0179281 A1 | 8/2006 | Jensen et al. |
| 2006/0179289 A1 | 8/2006 | Floyd et al. |
| 2006/0190707 A1 | 8/2006 | McIlvaine et al. |
| 2006/0212687 A1 | 9/2006 | Chen et al. |
| 2006/0230243 A1 | 10/2006 | Cochran et al. |
| 2006/0230253 A1 | 10/2006 | Codrescu et al. |
| 2006/0230409 A1 | 10/2006 | Frigo et al. |
| 2006/0236074 A1 | 10/2006 | Williamson et al. |
| 2006/0236080 A1 | 10/2006 | Doing et al. |
| 2006/0242365 A1 | 10/2006 | Ali et al. |
| 2006/0242384 A1 | 10/2006 | Ahmed et al. |
| 2006/0256641 A1 | 11/2006 | Johnstone |
| 2006/0277365 A1 | 12/2006 | Pong |
| 2006/0282839 A1 | 12/2006 | Hankins et al. |
| 2007/0006231 A1 | 1/2007 | Wang et al. |
| 2007/0074005 A1 | 3/2007 | Abernathy et al. |
| 2007/0186050 A1* | 8/2007 | Luick ................. G06F 12/0862 711/137 |
| 2007/0198665 A1 | 8/2007 | De et al. |
| 2007/0214343 A1 | 9/2007 | Lindholm et al. |
| 2007/0226722 A1 | 9/2007 | Chou |
| 2007/0262270 A1 | 11/2007 | Huang et al. |
| 2008/0016507 A1 | 1/2008 | Thomas et al. |
| 2008/0040724 A1 | 2/2008 | Kang et al. |
| 2008/0046666 A1 | 2/2008 | Termaine et al. |
| 2008/0052432 A1 | 2/2008 | Wilson et al. |
| 2008/0077813 A1 | 3/2008 | Keller et al. |
| 2008/0091880 A1 | 4/2008 | Vishin |
| 2008/0104598 A1 | 5/2008 | Chang |
| 2008/0109611 A1 | 5/2008 | Liu et al. |
| 2008/0126643 A1 | 5/2008 | Higuchi |
| 2008/0126771 A1* | 5/2008 | Chen ................. G06F 9/3844 712/238 |
| 2008/0148237 A1 | 6/2008 | Jiang et al. |
| 2008/0184211 A1 | 7/2008 | Nickolls et al. |
| 2008/0195844 A1 | 8/2008 | Shen et al. |
| 2008/0209190 A1* | 8/2008 | Bhargava ............. G06F 9/3844 712/240 |
| 2008/0215865 A1 | 9/2008 | Hino et al. |
| 2008/0225987 A1 | 9/2008 | Fazzi et al. |
| 2008/0235500 A1 | 9/2008 | Davis et al. |
| 2008/0250227 A1 | 10/2008 | Linderman et al. |
| 2008/0250232 A1 | 10/2008 | Nakashima |
| 2008/0256278 A1 | 10/2008 | Thomas et al. |
| 2008/0256330 A1 | 10/2008 | Wang et al. |
| 2008/0270758 A1 | 10/2008 | Ozer et al. |
| 2008/0270774 A1 | 10/2008 | Singh et al. |
| 2008/0282037 A1 | 11/2008 | Kusachi et al. |
| 2008/0320476 A1 | 12/2008 | Wingard et al. |
| 2009/0019264 A1 | 1/2009 | Correale, Jr. et al. |
| 2009/0031104 A1 | 1/2009 | Vorbach et al. |
| 2009/0063823 A1 | 3/2009 | Burky et al. |
| 2009/0070554 A1 | 3/2009 | Wang et al. |
| 2009/0113170 A1 | 4/2009 | Abdallah |
| 2009/0119457 A1 | 5/2009 | Latorre et al. |
| 2009/0138659 A1 | 5/2009 | Lauterbach |
| 2009/0138670 A1 | 5/2009 | Mutlu et al. |
| 2009/0150647 A1 | 6/2009 | Mejdrich et al. |
| 2009/0150890 A1 | 6/2009 | Yourst |
| 2009/0157980 A1 | 6/2009 | Bruce |
| 2009/0158017 A1 | 6/2009 | Mutlu et al. |
| 2009/0164733 A1 | 6/2009 | Kim et al. |
| 2009/0164766 A1 | 6/2009 | Suggs et al. |
| 2009/0165007 A1 | 6/2009 | Aghajanyan |
| 2009/0172344 A1 | 7/2009 | Grochowski et al. |
| 2009/0187536 A1 | 7/2009 | Jackson |
| 2009/0240919 A1 | 9/2009 | Alexander et al. |
| 2009/0241084 A1 | 9/2009 | Malley et al. |
| 2009/0249026 A1 | 10/2009 | Smelyanskiy et al. |
| 2009/0251476 A1 | 10/2009 | Jiao et al. |
| 2009/0282101 A1 | 11/2009 | Lim et al. |
| 2009/0287912 A1 | 11/2009 | Sendag |
| 2009/0307450 A1 | 12/2009 | Lee |
| 2009/0313462 A1 | 12/2009 | Emma et al. |
| 2009/0328053 A1 | 12/2009 | Dice |
| 2010/0058033 A1 | 3/2010 | Abernathy et al. |
| 2010/0064121 A1 | 3/2010 | Alexander et al. |
| 2010/0082912 A1 | 4/2010 | Lesartre et al. |
| 2010/0088443 A1 | 4/2010 | Riocreux et al. |
| 2010/0100690 A1 | 4/2010 | Rajamani et al. |
| 2010/0100704 A1 | 4/2010 | Hill et al. |
| 2010/0100707 A1 | 4/2010 | Mejdrich et al. |
| 2010/0115167 A1 | 5/2010 | Tardieux et al. |
| 2010/0115244 A1 | 5/2010 | Jensen et al. |
| 2010/0138607 A1 | 6/2010 | Hughes et al. |
| 2010/0154042 A1 | 6/2010 | Miyamoto et al. |
| 2010/0161948 A1 | 6/2010 | Abdallah |
| 2010/0169578 A1 | 7/2010 | Nychka et al. |
| 2010/0169611 A1 | 7/2010 | Chou et al. |
| 2010/0205603 A1 | 8/2010 | Merten et al. |
| 2010/0211746 A1 | 8/2010 | Tsukishiro |
| 2010/0280996 A1 | 11/2010 | Gross, IV et al. |
| 2010/0286976 A1 | 11/2010 | Gao et al. |
| 2010/0299671 A1 | 11/2010 | Kinsey |
| 2010/0306503 A1 | 12/2010 | Henry et al. |
| 2010/0325394 A1 | 12/2010 | Golla et al. |
| 2010/0332805 A1 | 12/2010 | Blasco et al. |
| 2011/0010521 A1 | 1/2011 | Wang et al. |

(56) References Cited

U.S. PATENT DOCUMENTS

| | | |
|---|---|---|
| 2011/0055479 A1 | 3/2011 | West et al. |
| 2011/0067016 A1 | 3/2011 | Mizrachi et al. |
| 2011/0082980 A1 | 4/2011 | Gschwind et al. |
| 2011/0082983 A1 | 4/2011 | Koktan |
| 2011/0093857 A1 | 4/2011 | Sydow et al. |
| 2011/0119660 A1 | 5/2011 | Tanaka |
| 2011/0153955 A1 | 6/2011 | Herrenschmidt et al. |
| 2011/0225588 A1 | 9/2011 | Pollock et al. |
| 2012/0005462 A1 | 1/2012 | Hall et al. |
| 2012/0023318 A1 | 1/2012 | Xing et al. |
| 2012/0042105 A1 | 2/2012 | Maeda et al. |
| 2012/0042126 A1 | 2/2012 | Krick et al. |
| 2012/0066483 A1 | 3/2012 | Boury et al. |
| 2012/0089812 A1 | 4/2012 | Smith |
| 2012/0096204 A1 | 4/2012 | Auerbach et al. |
| 2012/0198209 A1 | 8/2012 | Abdallah et al. |
| 2012/0246450 A1 | 9/2012 | Abdallah et al. |
| 2012/0246657 A1 | 9/2012 | Abdallah et al. |
| 2012/0278593 A1 | 11/2012 | Clark et al. |
| 2013/0019047 A1 | 1/2013 | Podvalny et al. |
| 2013/0036296 A1 | 2/2013 | Hickey et al. |
| 2013/0046934 A1 | 2/2013 | Nychka et al. |
| 2013/0086417 A1 | 4/2013 | Sivaramakrishnan et al. |
| 2013/0097369 A1 | 4/2013 | Talagala et al. |
| 2013/0138888 A1* | 5/2013 | Barreh ............ G06F 9/382 711/125 |
| 2013/0238874 A1 | 9/2013 | Avudaiyappan et al. |
| 2013/0283286 A1 | 10/2013 | Lee et al. |
| 2013/0304991 A1 | 11/2013 | Bottcher et al. |
| 2013/0311759 A1 | 11/2013 | Abdallah et al. |
| 2013/0339671 A1 | 12/2013 | Williams, III et al. |
| 2013/0346699 A1 | 12/2013 | Walker |
| 2014/0032844 A1 | 1/2014 | Avudaiyappan et al. |
| 2014/0032845 A1 | 1/2014 | Avudaiyappan et al. |
| 2014/0032856 A1 | 1/2014 | Avudaiyappan et al. |
| 2014/0075168 A1 | 3/2014 | Abdallah |
| 2014/0108730 A1 | 4/2014 | Avudaiyappan et al. |
| 2014/0123145 A1 | 5/2014 | Barrow-Williams et al. |
| 2014/0156947 A1 | 6/2014 | Avudaiyappan et al. |
| 2014/0181833 A1 | 6/2014 | Bird et al. |
| 2014/0281242 A1 | 9/2014 | Abdallah et al. |
| 2014/0281411 A1 | 9/2014 | Abdallah |
| 2014/0281412 A1 | 9/2014 | Abdallah et al. |
| 2014/0281416 A1 | 9/2014 | Abdallah et al. |
| 2014/0281426 A1 | 9/2014 | Abdallah et al. |
| 2014/0281427 A1 | 9/2014 | Abdallah |
| 2014/0281428 A1 | 9/2014 | Abdallah et al. |
| 2014/0281436 A1 | 9/2014 | Abdallah |
| 2014/0282592 A1 | 9/2014 | Abdallah et al. |
| 2014/0282601 A1 | 9/2014 | Abdallah et al. |
| 2014/0317387 A1 | 10/2014 | Abdallah et al. |
| 2014/0344554 A1 | 11/2014 | Abdallah |
| 2014/0373022 A1 | 12/2014 | Chan et al. |
| 2015/0039859 A1 | 2/2015 | Abdallah |
| 2015/0046683 A1 | 2/2015 | Abdallah |
| 2015/0046686 A1 | 2/2015 | Abdallah |
| 2015/0186144 A1 | 7/2015 | Abdallah |
| 2016/0041908 A1 | 2/2016 | Avudaiyappan et al. |
| 2016/0041913 A1 | 2/2016 | Avudaiyappan et al. |
| 2016/0041930 A1 | 2/2016 | Avudaiyappan et al. |
| 2016/0154653 A1 | 6/2016 | Abdallah et al. |
| 2016/0210145 A1 | 7/2016 | Abdallah et al. |
| 2016/0210176 A1 | 7/2016 | Abdallah et al. |
| 2016/0371188 A1 | 12/2016 | Abdallah et al. |

FOREIGN PATENT DOCUMENTS

| | | |
|---|---|---|
| CN | 1451115 A | 10/2003 |
| CN | 1613056 A | 5/2005 |
| CN | 1214666 C | 8/2005 |
| CN | 1650260 A | 8/2005 |
| CN | 1713137 A | 12/2005 |
| CN | 1774709 A | 5/2006 |
| CN | 1841314 A | 10/2006 |
| CN | 1841332 A | 10/2006 |
| CN | 1848095 A | 10/2006 |
| CN | 1881223 A | 12/2006 |
| CN | 101114218 A | 1/2008 |
| CN | 101151594 A | 3/2008 |
| CN | 101241428 A | 8/2008 |
| CN | 101313288 A | 11/2008 |
| CN | 101344840 A | 1/2009 |
| CN | 101449256 A | 6/2009 |
| CN | 101582025 A | 11/2009 |
| CN | 101627365 A | 1/2010 |
| CN | 101763245 A | 6/2010 |
| CN | 101916180 A | 12/2010 |
| CN | 102105864 A | 6/2011 |
| EP | 0596636 A2 | 5/1994 |
| EP | 0706133 A2 | 4/1996 |
| EP | 0813145 A2 | 12/1997 |
| EP | 2616928 A2 | 7/2013 |
| GB | 2343270 A | 5/2000 |
| GB | 2452316 A | 3/2009 |
| JP | 2000330790 A | 11/2000 |
| JP | 2010-226275 A | 10/2010 |
| KR | 20010050794 A | 6/2001 |
| KR | 20010053622 | 6/2001 |
| KR | 20100036309 A | 1/2010 |
| TW | 200707284 | 3/1995 |
| TW | 539996 B | 7/2003 |
| TW | 544626 B | 8/2003 |
| TW | 200401187 A | 1/2004 |
| TW | 200405201 A | 4/2004 |
| TW | 591530 B | 6/2004 |
| TW | 200422949 A | 11/2004 |
| TW | I233545 B | 6/2005 |
| TW | I281121 B | 5/2007 |
| TW | 200813766 A | 3/2008 |
| TW | 200844853 A | 11/2008 |
| TW | 200941339 A | 10/2009 |
| TW | I315488 B | 10/2009 |
| TW | 200949690 A | 12/2009 |
| TW | I329437 B | 8/2010 |
| TW | I331282 B | 10/2010 |
| TW | I352288 B | 11/2011 |
| TW | 201227520 A | 7/2012 |
| TW | 201241744 A | 10/2012 |
| TW | 201305819 A | 2/2013 |
| WO | WO-9750031 A1 | 12/1997 |
| WO | WO-9919793 A1 | 4/1999 |
| WO | WO-0125921 A1 | 4/2001 |
| WO | 03/58434 A1 | 7/2003 |
| WO | WO-2004114128 A2 | 12/2004 |
| WO | WO-2007027671 A2 | 3/2007 |
| WO | WO-2008021434 A1 | 2/2008 |
| WO | WO-2008061154 A2 | 5/2008 |
| WO | WO-2009012296 A2 | 1/2009 |
| WO | WO-2009101563 A1 | 8/2009 |
| WO | WO-2010049585 A1 | 5/2010 |
| WO | WO-2012135031 A2 | 10/2012 |
| WO | WO-2012135050 A2 | 10/2012 |

OTHER PUBLICATIONS

Communication pursuant to Article 94(3) EPC for Application No. 14769411.1, dated Dec. 7, 2018, 7 pages.
Communication pursuant to Article 94(3) EPC for Application No. 11876130.3, dated Jan. 15, 2019, 11 pages.
Communication pursuant to Article 94(3) EPC for Application No. 11876130.3, dated Oct. 29, 2018, 7 pages.
Communication pursuant to Article 94(3) EPC for Application No. 11876314.3, dated Oct. 19, 2018, 5 pages.
Communication pursuant to Article 94(3) EPC for Application no. 11876314.3, dated Sep. 24, 2018, 6 pages.
Non-Final Office Action from U.S. Appl. No. 15/354,742, dated Dec. 4, 2018, 54 pages.
Non-Final Office Action from U.S. Appl. No. 15/283,836, dated Dec. 27, 2018, 150 pages.
Notice of Allowance from U.S. Appl. No. 15/853,323, dated Jan. 15, 2019, 15 pages.

(56) References Cited

OTHER PUBLICATIONS

Notice of Allowance from U.S. Appl. No. 15/862,496, dated Nov. 32, 2018, 23 pages.
Notice of Allowance from U.S. Appl. No. 13/824,013, dated Nov. 13, 2018, 12 pages.
Notice of Allowance from foreign counterpart Korean Patent Application No. 10-2018-7003058, dated Dec. 31, 2018, 3 pages.
Notice of Allowance from U.S. Appl. No. 15/706,056, dated Dec. 28, 2018, 138 pages.
Office Action and Search Report from foreign counterpart Taiwan Patent Application No. 106127331, dated Nov. 23, 2018, 13 pages.
Second Office Action from foreign counterpart Chinese Patent Application No. 201480024528.0, dated Oct. 8, 2018, 7 pages.
Communication pursuant to Article 94(3) EPC, EP App. No. 147694111, Oct. 8, 2019, 10 pages.
Decision on Rejection, CN App. No. 201480024832.5, Oct. 9, 2019, 7 pages.
Examination Report, IN App. No. 2195/CHENP/2013, dated Jul. 18, 2019, 6 pages.
Examination Report, IN App. No. 7383/CHENP/2013, dated Aug. 5, 2019, 6 pages.
First Office Action, CN App. No. 201710264673.1, dated Jan. 9, 2020, 15 pages (8 pages of English Translation and 7 pages of Office Action).
First Office Action, CN App. No. 201710764883.7, dated Nov. 27, 2019, 11 pages (5 page of English Translation and 6 pages of Office Action).
First Office Action, IN App. No. 7380/CHENP/2013, dated Jun. 27, 2019, pp. 1-6.
Grant of Patent, KR App. No. 10-2017-7020829, dated Nov. 25, 2019, 3 pages (1 page of English Translation and 2 pages of Office Action).
Intention to Grant, EP App. No. 11876314.3, dated Dec. 2, 2019, 5 pages.
Notice of Allowance, KR App. No. 10-2017-7003623, dated Sep. 30, 2019, 2 pages (1 page of English Translation and 1 page of Original Document).
Notice of Allowance, U.S. Appl. No. 15/884,280, dated Oct. 23, 2019, 9 pages.
Notice of Allowance, U.S. Appl. No. 15/944,655, dated Dec. 17, 2019, 5 pages.
Final Office Action from U.S. Appl. No. 15/944,655, dated Sep. 27, 2019, 13 pages.
Notice of Allowance from U.S. Appl. No. 15/283,836, dated Sep. 9, 2019, 5 pages.
Office Action from Indian Patent Application NO. 3678/CHENP/2014, dated Mar. 11, 2019, 7 pages.
Abandonment from U.S. Appl. No. 15/866,323, dated Apr. 29, 2019, 2 pages.
Advisory Action from U.S. Appl. No. 15/408,323, dated May 20, 2019, 3 pages.
Communication Pursuant to Article 94(3) EPC for Application No. 14769450.9, dated May 17, 2019, 12 pages.
Corrected Notice of Allowance from U.S. Appl. No. 15/354,742, dated Jun. 21, 2019, 38 pages.
Corrected Notice of Allowance from U.S. Appl. No. 15/354,742, dated May 22, 2019, 32 pages.
Final Office Action from U.S. Appl. No. 15/283,836, dated May 7, 2019, 14 pages.
Non-Final Office Action from U.S. Appl. No. 15/806,189, dated May 1, 2019, 145 pages.
Non-Final Office Action from U.S. Appl. No. 15/944,655, dated May 15, 2019, 135 pages.
Notice of Preliminary Rejection from foreign counterpart Korean Patent Application No. 10-2017-7003623, dated Mar. 29, 2019, 5 pages.
Notice of Reason for Refusal from foreign counterpart Korean Patent Application No. KR20177020829, dated May 20, 2019, 11 pages.

Requirement for Restriction/Election from U.S. Appl. No. 15/884,280, dated Jun. 17, 2019, 5 pages.
Communication pursuant to Article 94(3) EPC, EP App. No. 12764627.1, dated Feb. 25, 2020, 5 pages.
Communication pursuant to Article 94(3) EPC, EP App. No. 12764838.4, dated Feb. 25, 2020, 5 pages.
Decision on Reexamination, CN App. No. 201480024832.5, dated Feb. 21, 2020, 2 pages (1 page of English Translation and 1 page of Office Action).
Examination Report, IN App No. 7466/CHENP/2013, dated Nov. 18, 2019, 7 pages.
Examination Report, IN App. No. 5551/CHENP/2015, dated Jan. 20, 2020, 6 pages.
First Office Action, IN App. No. 3611/CHENP/2014, dated Nov. 26, 2019, pp. 1-8.
First Office Action, IN App. No. 5509/CHENP/2015, dated Jan. 16, 2020, pp. 1-6.
Intention to Grant a Patent, EP App No. 12174228.2, dated Dec. 13, 2013, 6 pages.
Non-Final Office Action, U.S. Appl. No. 15/408,323, dated Feb. 25, 2020, 9 pages.
Intention to Grant, EP App. No. 11876130.3, dated Jan. 14, 2020, 60 pages.
Intention to Grant, EP App. No. 16196777.3, dated Dec. 9, 2019, 7 pages.
Office Action, IN App. No. 9176/CHENP/2013, dated Aug. 20, 2019, 9 pages.
Office Action, IN App. No. 9177/CHENP/2013, dated Nov. 15, 2019, 9 pages.
Search Report, CN App. No. 201180076245.7, dated Mar. 7, 2016, 1 page.
Abandonment from U.S. Appl. No. 13/824,013, dated Mar. 3, 2015, 1 page.
Abandonment from U.S. Appl. No. 14/212,203, dated Jul. 26, 2018, 2 pages.
Abandonment from U.S. Appl. No. 14/212,533, dated Jun. 19, 2018, 3 pages.
Abandonment from U.S. Appl. No. 14/360,282, dated May 25, 2018, 2 pages.
Abandonment from U.S. Appl. No. 15/354,857, dated Jul. 30, 2018, 2 pages.
Advisory Action from U.S. Appl. No. 12/296,919, dated Aug. 26, 2011, 3 pages.
Advisory Action from U.S. Appl. No. 14/212,203, dated Apr. 5, 2018, 8 pages.
Advisory Action from U.S. Appl. No. 14/214,280, dated May 15, 2017, 3 pages.
Advisory Action from U.S. Appl. No. 14/360,282, dated Jan. 23, 2018, 2 pages.
Barham P., et al., "Xen and the Art of Virtualization," Proceedings of the ACM Symposium on Operating Systems Principles, XP002298786, Oct. 2003, pp. 164-177.
Communication pursuant to Article 94(3) EPC for Application No. 14770976.0, dated Mar. 16, 2018, 4 pages.
Communication pursuant to Article 94(3) EPC for Application No. 11876128.7, dated Feb. 5, 2018, 9 pages.
Communication pursuant to Article 94(3) EPC for Application No. 11876130.3, dated Feb. 5, 2018, 9 pages.
Communication pursuant to Article 94(3) EPC for Application No. 11876314.3, dated Feb. 5, 2018, 8 pages.
Communication pursuant to Article 94(3) EPC for Application No. 12789667.8, dated Feb. 21, 2018, 4 pages.
Communication pursuant to Article 94(3) EPC for European Application No. 070864410, dated Mar. 16, 2012, 4 pages.
Communication pursuant to Article 94(3) EPC for European Application No. 070864410, dated Nov. 14, 2012, 4 pages.
Communication pursuant to Article 94(3) EPC for European Application No. 07811845, dated Apr. 16, 2014, 5 pages.
Communication pursuant to Article 94(3) EPC for European Application No. 07811845, dated Dec. 21, 2015, 3 pages.
Communication pursuant to Article 94(3) EPC for European Application No. 07811845, dated Feb. 3, 2014, 5 pages.

(56) References Cited

OTHER PUBLICATIONS

Communication pursuant to Article 94(3) EPC for European Application No. 07811845, dated Feb. 16, 2011, 6 pages.
Communication pursuant to Article 94(3) EPC for European Application No. 07811845, dated Jan. 27, 2012, 7 pages.
Communication pursuant to Article 94(3) EPC for European Application No. 12150513, dated Apr. 16, 2013, 5 pages.
Communication pursuant to Article 94(3) EPC for European Application No. 12150513, dated Dec. 21, 2015, 4 pages.
Communication pursuant to Article 94(3) EPC for European Application No. 12150513, dated May 9, 2014, 8 pages.
Communication pursuant to Article 94(3) EPC for European Application No. 12174228, dated Jun. 11, 2013, 3 pages.
Communication pursuant to Article 94(3) EPC for European Application No. 12764627, dated Oct. 4, 2016, 4 pages.
Communication pursuant to Article 94(3) EPC for European Application No. 12788989.7, dated Jun. 22, 2017, 6 pages.
Communication pursuant to Rules 161(2) and 162 EPC for Application No. 12763717, dated Nov. 22, 2013, 3 pages.
Communication pursuant to Rules 70(2) and 70a(2) EPC for Application No. 12763717, dated Oct. 10, 2014, 1 page.
Cooperman, "Cache Basics," Winter 2003, downloaded from http://www.ccs.neu.edu/course/com3200/parent/NOTES/cache-basics.html on Sep. 24, 2015, 3 pages. (no publication month available).
Corrected Notice of Allowance from U.S. Appl. No. 13/475,708, dated Feb. 14, 2018, 27 pages.
Corrected Notice of Allowance from U.S. Appl. No. 13/475,708, dated Feb. 26, 2018, 31 pages.
Corrected Notice of Allowance from U.S. Appl. No. 15/357,943, dated Apr. 2, 2018, 4 pages.
Decision to Grant a Patent for European Application No. 07811845, dated Jun. 16, 2016, 2 pages.
Decision to Grant a Patent for European Application No. 12150513, dated Jun. 16, 2016, 2 pages.
Decision to Grant a Patent for European Application No. 12174228, dated Dec. 13, 2013, 5 pages.
Decision to Grant a Patent for Korean Application No. KR1020137027843, dated Apr. 29, 2016, 2 pages.
Decision to Grant a Patent for Korean Patent Application No. 20137027842, dated Mar. 31, 2016, 2 pages.
Decision to grant a patent from foreign counterpart Korean Patent Application No. 10-2014-7016774, dated Jul. 25, 2016, 2 pages.
Decision to Grant a Patent from foreign counterpart Korean Patent Application No. 20137033565, dated Apr. 29, 2016, 2 pages.
Decision to Grant a Patent from foreign counterpart Korean Patent Application No. 20137033566, dated Apr. 29, 2016, 2 pages.
Decision to Grant a Patent from foreign counterpart Korean Patent Application No. KR1020157029107, dated Apr. 25, 2017, 2 pages.
Examination Report for European Application No. 12763717, dated Nov. 28, 2016, 5 pages.
Extended European Search Report for Application No. 07811845.2, dated Nov. 2, 2009, 7 pages.
Extended European Search Report for Application No. 07864410, dated Feb. 19, 2010, 8 pages.
Extended European Search Report for Application No. 11876314.3, dated Jun. 14, 2016, 6 pages.
Extended European Search Report for Application No. 12150513, dated Jun. 19, 2012, 8 pages.
Extended European Search Report for Application No. 12174228, dated Oct. 16, 2012, 4 pages.
Extended European Search Report for Application No. 12174229, dated Jul. 4, 2014, 10 pages.
Extended European Search Report for Application No. 12788989, dated May 12, 2016, 9 pages.
Extended European Search Report for Application No. 12789667, dated Feb. 26, 2016, 7 pages.
Extended European Search Report for Application No. 14769411.1, dated Apr. 5, 2017, 8 pages.
Extended European Search Report for Application No. 14769450.9, dated Feb. 21, 2017, 16 pages.
Extended European Search Report for Application No. 16196777.3, dated Mar. 20, 2017, 6 pages.
Extended European Search Report for Application No. EP11826042, dated Jan. 24, 2014, 6 pages.
Extended European Search Report for Application No. EP11876128, dated Jun. 21, 2016, 8 pages.
Extended European Search Report for Application No. EP11876130, dated Jun. 1, 2016, 7 pages.
Extended European Search Report for Application No. EP12763717, dated Sep. 24, 2014, 5 pages.
Extended European Search Report for Application No. EP12764627, dated Jul. 10, 2014, 5 pages.
Extended European Search Report for Application No. EP12764838, dated Jul. 10, 2014, 5 pages.
Final Office Action from U.S. Appl. No. 12/296,919, dated Jun. 14, 2011, 7 pages.
Final Office Action from U.S. Appl. No. 12/296,919, dated Oct. 22, 2010, 7 pages.
Final Office Action from U.S. Appl. No. 12/514,303, dated Jan. 24, 2013, 11 pages.
Final Office Action from U.S. Appl. No. 13/428,438, dated Dec. 24, 2014, 17 pages.
Final Office Action from U.S. Appl. No. 13/428,440, dated Dec. 24, 2014, 19 pages.
Final Office Action from U.S. Appl. No. 13/428,452, dated Dec. 24, 2014, 20 pages.
Final Office Action from U.S. Appl. No. 13/475,708, dated Jun. 9, 2016, 35 pages.
Final Office Action from U.S. Appl. No. 13/475,708, dated May 8, 2015, 23 pages.
Final Office Action from U.S. Appl. No. 13/475,739, dated Feb. 4, 2015, 12 pages.
Final Office Action from U.S. Appl. No. 13/475,739, dated Nov. 23, 2015, 28 pages.
Final Office Action from U.S. Appl. No. 14/194,589, dated Apr. 19, 2016, 7 pages.
Final Office Action from U.S. Appl. No. 14/212,203, dated Dec. 13, 2016, 20 pages.
Final Office Action from U.S. Appl. No. 14/212,203, dated Sep. 12, 2017, 84 pages.
Final Office Action from U.S. Appl. No. 14/212,533, dated Jan. 4, 2017, 27 pages.
Final Office Action from U.S. Appl. No. 14/212,533, dated Sep. 8, 2017, 69 pages.
Final Office Action from U.S. Appl. No. 14/213,115, dated Feb. 3, 2015, 11 pages.
Final Office Action from U.S. Appl. No. 14/213,115, dated Mar. 7, 2016, 18 pages.
Final Office Action from U.S. Appl. No. 14/213,135, dated Oct. 26, 2015, 20 pages.
Final Office Action from U.S. Appl. No. 14/213,218, dated Jul. 6, 2016, 24 pages.
Final Office Action from U.S. Appl. No. 14/213,218, dated Jul. 22, 2015, 16 pages.
Final Office Action from U.S. Appl. No. 14/213,692, dated Jan. 20, 2016, 18 pages.
Final Office Action from U.S. Appl. No. 14/213,730, dated May 11, 2016, 14 pages.
Final Office Action from U.S. Appl. No. 14/213,854, dated Nov. 9, 2015, 19 pages.
Final Office Action from U.S. Appl. No. 14/214,045, dated Aug. 29, 2016, 14 pages.
Final Office Action from U.S. Appl. No. 14/214,176, dated Aug. 29, 2016, 17 pages.
Final Office Action from U.S. Appl. No. 14/214,280, dated Mar. 6, 2017, 12 pages.
Final Office Action from U.S. Appl. No. 14/214,280, dated Mar. 11, 2016, 18 pages.
Final Office Action from U.S. Appl. No. 14/214,280, dated Oct. 24, 2016, 20 pages.
Final Office Action from U.S. Appl. No. 14/216,493, dated Aug. 30, 2016, 21 pages.

(56) References Cited

OTHER PUBLICATIONS

Final Office Action from U.S. Appl. No. 14/216,493, dated May 22, 2017, 17 pages.
Final Office Action from U.S. Appl. No. 14/216,859, dated Jun. 9, 2016, 16 pages.
Final Office Action from U.S. Appl. No. 14/360,280, dated Aug. 10, 2017, 103 pages.
Final Office Action from U.S. Appl. No. 14/360,280, dated Jul. 24, 2018, 24 pages.
Final Office Action from U.S. Appl. No. 14/360,282, dated Feb. 16, 2017, 10 pages.
Final Office Action from U.S. Appl. No. 14/360,282, dated Oct. 4, 2017, 22 pages.
Final Office Action from U.S. Appl. No. 14/360,284, dated Mar. 1, 2017, 10 pages.
Final Office Action from U.S. Appl. No. 15/082,359, dated Jan. 31, 2018, 22 pages.
Final Office Action from U.S. Appl. No. 15/219,063, dated Nov. 20, 2017, 27 pages.
Final Office Action from U.S. Appl. No. 15/354,742, dated Nov. 29, 2017, 20 pages.
Final Office Action from U.S. Appl. No. 15/354,857, dated Nov. 28, 2017, 23 pages.
First Office Action and Search Report from foreign counterpart China Patent Application No. 201480024463.X, dated Apr. 1, 2017, 31 pages. (Translation available only for office action).
First Office Action and Search Report from foreign counterpart Chinese Patent Application No. 201480024528.0, dated Jan. 26, 2018, 19 pages.(Translation available only for office action).
First Office Action and Search Report from foreign counterpart Chinese Patent Application No. 201480024832.5, dated Feb. 6, 2018, 15 pages. (Translation available only for office action).
First Office Action from foreign counterpart China Patent Application No. 201180076245.7, dated Mar. 21, 2016, 10 pages.
First Office Action from foreign counterpart China Patent Application No. CN201280034725, dated Oct. 26, 2015, 26 pages.
First Office Action from foreign counterpart China Patent Application No. CN201280034739, dated Nov. 3, 2015, 39 pages.
First Office Action from foreign counterpart China Patent Application No. CN201310589048, dated Feb. 2, 2016, 8 pages.
First Office Action from foreign counterpart Chinese patent application No. 201280024095, dated May 26, 2016, 32 pages.
First Office Action from foreign counterpart Chinese Patent Application No. 201280024054.0, dated May 30, 2016, 24 pages.
Fourth Office Action and Search report from foreign counterpart China Patent Application No. 201180076248.0, dated Nov. 9, 2017, 38 pages. (Translation available only for office action).
Franklin, et al., "The Expandable Split Window Paradigm for Exploiting Fine-Grain Parallelism," ACM SIGARCH Computer Architecture News—Special Issue: Proceedings of the 19th annual international symposium on Computer architecture (ISCA '92), Association for Computing Machinery (ACM), New York, NY, vol. 20 (2), May, 1992, pp. 58-67.
Garmany J., "The Power of Indexing: Oracle Tips by Burleson Consulting," Burleson Enterprises, Inc., archived on Mar. 9, 2009, retrieved Sep. 17, 2015 via Internet: web.archive.org/web/20090309201136/http://dba-oracle.com/t_indexing_power.htm, 7 pages.
Hu, et al., "An Approach for Implementing Efficient Superscalar CISC Processors," High Performance Computer Architecture, 2006, Twelfth International Symposium on Austin, Texas Feb. 11-15, 2006, pp. 40-51.
Intention to Grant a patent for European Application No. 07811845, dated Mar. 31, 2016, 58 pages.
Intention to Grant a patent for European Application No. 12150513, dated Mar. 15, 2016, 59 pages.
Intention to grant from foreign counterpart European Patent Application No. 12788989.7, dated Feb. 23, 2018, 47 pages.
International Preliminary Report on Patentability and for Application No. PCT/US2007/084710, dated May 19, 2009, 4 pages.
International Preliminary Report on Patentability and Written Opinion for Application No. PCT/US2007/066536, dated Oct. 14, 2008, 6 pages.
International Preliminary Report on Patentability and Written Opinion for Application No. PCT/US2012/038711, dated Nov. 20, 2013, 5 pages.
International Preliminary Report on Patentability and Written Opinion for Application No. PCT/US2012/038713, dated Nov. 20, 2013, 5 pages.
International Preliminary Report on Patentability for Application No. PCT/US2011/051992, dated Mar. 28, 2013, 8 pages.
International Preliminary Report on Patentability for Application No. PCT/US2011/061940, dated Jun. 5, 2014, 6 pages.
International Preliminary Report on Patentability for Application No. PCT/US2011/061953, dated Jun. 5, 2014, 7 pages.
International Preliminary Report on Patentability for Application No. PCT/US2011/061957, dated Jun. 5, 2014, 7 pages.
International Preliminary Report on Patentability for Application No. PCT/US2012/030383, dated Oct. 10, 2013, 6 pages.
International Preliminary Report on Patentability for Application No. PCT/US2012/030409, dated Oct. 10, 2013, 6 pages.
International Preliminary Report on Patentability for Application No. PCT/US2012/30360, dated Oct. 10, 2013, 6 pages.
International Preliminary Report on Patentability for Application No. PCT/US2014/024276, dated Sep. 24, 2015, 6 pages.
International Preliminary Report on Patentability for Application No. PCT/US2014/024608, dated Sep. 24, 2015, 8 pages.
International Preliminary Report on Patentability for Application No. PCT/US2014/024677, dated Sep. 24, 2015, 7 pages.
International Preliminary Report on Patentability for Application No. PCT/US2014/024722, dated Sep. 24, 2015, 6 pages.
International Preliminary Report on Patentability for Application No. PCT/US2014/024775, dated Sep. 24, 2015, 6 pages.
International Preliminary Report on Patentability for Application No. PCT/US2014/024828, dated Sep. 24, 2015, 8 pages.
International Search Report and Written Opinion for Application No. PCT/US2007/084710, dated May 22, 2008, 6 pages.
International Search Report and Written Opinion for Application No. PCT/US2011/051992, dated Mar. 28, 2012, 11 pages.
International Search Report and Written Opinion for Application No. PCT/US2011/061940, dated Jul. 20, 2012, 8 pages.
International Search Report and Written Opinion for Application No. PCT/US2011/061953, dated Jul. 24, 2012, 8 pages.
International Search Report and Written Opinion for Application No. PCT/US2011/061957, dated Jul. 20, 2012, 8 pages.
International Search Report and Written Opinion for Application No. PCT/US2012/030383, dated Oct. 25, 2012, 8 pages.
International Search Report and Written Opinion for Application No. PCT/US2012/030409, dated Oct. 12, 2012, 7 pages.
International Search Report and Written opinion for Application No. PCT/US2012/038711, dated Nov. 28, 2012, 7 pages.
International Search Report and Written Opinion for Application No. PCT/US2012/038713, dated Oct. 29, 2012, 7 pages.
International Search Report and Written Opinion for Application No. PCT/US2012/30360, dated Oct. 29, 2012, 7 pages.
International Search Report and Written Opinion for Application No. PCT/US2014/024276, dated Jul. 31, 2014, 7 pages.
International Search Report and Written Opinion for Application No. PCT/US2014/024608, dated Jul. 31, 2014, 9 pages.
International Search Report and Written Opinion for Application No. PCT/US2014/024677, dated Jun. 30, 2014, 9 pages.
International Search Report and Written Opinion for Application No. PCT/US2014/024722, dated Jun. 27, 2014, 7 pages.
International Search Report and Written Opinion for Application No. PCT/US2014/024775, dated Jun. 2, 2014, 7 pages.
International Search Report and Written Opinion for Application No. PCT/US2014/024828, dated Jul. 28, 2014, 9 pages.
International Search Report for Application No. PCT/US2007/066536, dated Jul. 30, 2008, 2 pages.
Jacobson, et al., "Path-based Next Trace Prediction," MICRO 30—Proceedings of the 30th Annual IEEE/ACM International Symposium on Microarchitecture, Dec. 1-3, 1997, IEEE Computer Society, Washington, D.C., 1997, pp. 14-23.

(56) References Cited

OTHER PUBLICATIONS

Kozyrakis, et al., "A New Direction for Computer Architecture Research," Computer, IEEE Computer Society Press, Los Alamitos, CA, Nov. 1, 1998, vol. 31 (11), pp. 24-32.
Mogul J.C., et al., "Potential Benefits of Delta Encoding and Data Compression for HTTP," Oct. 1, 1997, ACM, SIGCOMM '97, pp. 181-194.
Nagarajan et al., "A Design Space Evaluation of Grid Processor Architectures," 34th ACM/IEEE International Symposium, Piscataway, NJ, Dec. 1-5, 2001, pp. 40-51.
Nanda, et al., "The Misprediction Recovery Cache," International Journal of Parallel Programming—Special issue: MICRO-29, 29th annual IEEE/ACM international symposium on microarchitecture, Plenum Press, New York, NY, Aug. 1998, vol. 26 (4), pp. 383-415.
Non-Final Office Action from U.S. Appl. No. 12/296,919, dated Apr. 7, 2011, 8 pages.
Non-Final Office Action from U.S. Appl. No. 12/296,919, dated Jun. 14, 2010, 7 pages.
Non-Final Office Action from U.S. Appl. No. 12/296,919, dated Mar. 7, 2012, 7 pages.
Non-Final Office Action from U.S. Appl. No. 12/514,303, dated Jun. 27, 2013, 7 pages.
Non-Final Office Action from U.S. Appl. No. 12/514,303, dated May 10, 2012, 9 pages.
Non-Final Office Action from U.S. Appl. No. 13/428,438, dated Apr. 24, 2014, 15 pages.
Non-Final Office Action from U.S. Appl. No. 13/428,438, dated May 1, 2015, 12 pages.
Non-Final Office Action from U.S. Appl. No. 13/428,440, dated Jun. 18, 2014, 16 pages.
Non-Final Office Action from U.S. Appl. No. 13/428,440, dated May 4, 2015, 13 pages.
Non-Final Office Action from U.S. Patent Application No. 13/428,452, dated Apr. 23, 2015, 11 pages.
Non-Final Office Action from U.S. Appl. No. 13/428,452, dated Apr. 28, 2014, 21 pages.
Non-Final Office Action from U.S. Appl. No. 13/475,708, dated Feb. 11, 2015, 27 pages.
Non-Final Office Action from U.S. Appl. No. 13/475,708, dated Feb. 12, 2016, 37 pages.
Non-Final Office Action from U.S. Appl. No. 13/475,739, dated May 21, 2015, 14 pages.
Non-Final Office Action from U.S. Appl. No. 13/475,739, dated Sep. 2, 2014, 15 pages.
Non-Final Office Action from U.S. Appl. No. 13/691,609, dated Jan. 15, 2014, 5 pages.
Non-Final Office Action from U.S. Appl. No. 13/691,609, dated Sep. 5, 2013, 11 pages.
Non-Final Office Action from U.S. Appl. No. 13/824,013, dated Feb. 7, 2018, 141 pages.
Non-Final Office Action from U.S. Appl. No. 14/194,589, dated Nov. 19, 2015, 12 pages.
Non-Final Office Action from U.S. Appl. No. 14/212,203, dated Mar. 24, 2017, 68 pages.
Non-Final Office Action from U.S. Appl. No. 14/212,203, dated Sep. 8, 2016, 52 pages.
Non-Final Office Action from U.S. Appl. No. 14/212,533, dated Sep. 22, 2016, 52 pages.
Non-Final Office Action from U.S. Appl. No. 14/213,115, dated Oct. 19, 2015, 24 pages.
Non-Final Office Action from U.S. Appl. No. 14/213,115, dated Sep. 22, 2014, 19 pages.
Non-Final Office Action from U.S. Appl. No. 14/213,135, dated May 14, 2015, 23 pages.
Non-Final Office Action from U.S. Appl. No. 14/213,135, dated May 31, 2016, 14 pages.
Non-Final Office Action from U.S. Appl. No. 14/213,218, dated Apr. 22, 2015, 22 pages.
Non-Final Office Action from U.S. Appl. No. 14/213,218, dated Feb. 2, 2016, 17 pages.
Non-final Office Action from U.S. Appl. No. 14/213,692, dated Aug. 24, 2015, 30 pages.
Non-final Office Action from U.S. Appl. No. 14/213,692, dated Jun. 13, 2016, 17 pages.
Non-Final Office Action from U.S. Appl. No. 14/213,730, dated Jan. 7, 2016, 27 pages.
Non-Final Office Action from U.S. Appl. No. 14/213,854, dated Apr. 29, 2016, 13 pages.
Non-Final Office Action from U.S. Appl. No. 14/213,854, dated Jun. 19, 2015, 23 pages.
Non-Final Office Action from U.S. Appl. No. 14/214,045, dated Apr. 1, 2016, 61 pages.
Non-Final Office Action from U.S. Appl. No. 14/214,045, dated Dec. 19, 2016, 88 pages.
Non-Final Office Action from U.S. Appl. No. 14/214,176, dated Jan. 6, 2017, 36 pages.
Non-Final Office Action from U.S. Appl. No. 14/214,176, dated Mar. 25, 2016, 25 pages.
Non-Final Office Action from U.S. Appl. No. 14/214,280, dated Jan. 6, 2017, 14 pages.
Non-Final Office Action from U.S. Appl. No. 14/214,280, dated Jun. 16, 2016, 12 pages.
Non-Final Office Action from U.S. Appl. No. 14/214,280, dated Sep. 18, 2015, 18 pages.
Non-Final Office Action from U.S. Appl. No. 14/215,633, dated Oct. 22, 2015, 18 pages.
Non-final Office Action from U.S. Appl. No. 14/216,493, dated Apr. 4, 2016, 26 pages.
Non-Final Office Action from U.S. Appl. No. 14/216,493, dated Mar. 29, 2017, 18 pages.
Non-Final Office Action from U.S. Appl. No. 14/216,859, dated Jan. 28, 2016, 33 pages.
Non-Final Office Action from U.S. Appl. No. 14/360,280, dated Dec. 14, 2017, 25 pages.
Non-Final Office Action from U.S. Appl. No. 14/360,280, dated Feb. 23, 2017, 34 pages.
Non-Final Office Action from U.S. Appl. No. 14/360,282, dated Jun. 22, 2017, 97 pages.
Non-Final Office Action from U.S. Appl. No. 14/360,282, dated Oct. 21, 2016, 13 pages.
Non-final Office Action from U.S. Appl. No. 14/360,284, dated Oct. 21, 2016, 32 pages.
Non-Final Office Action from U.S. Appl. No. 14/733,827, dated Apr. 28, 2017, 99 pages.
Non-Final Office Action from U.S. Appl. No. 15/082,359, dated Aug. 11, 2017, 108 pages.
Non-Final Office Action from U.S. Appl. No. 15/219,063, dated May 30, 2017, 102 pages.
Non-Final Office Action from U.S. Appl. No. 15/257,593, dated Apr. 7, 2017, 37 pages.
Non-final Office Action from U.S. Appl. No. 15/354,742, dated Aug. 25, 2017, 152 pages.
Non-Final Office Action from U.S. Appl. No. 15/354,857, dated Sep. 12, 2017, 111 pages.
Non-final Office Action from U.S. Appl. No. 15/357,943, dated Aug. 25, 2017, 111 pages.
Non-Final Office Action from U.S. Appl. No. 15/712,017, dated May 7, 2018, 127 pages.
Non-Final Office Action from U.S. Appl. No. 15/862,496, dated Apr. 5, 2018, 151 pages.
Non-Final Office Action from U.S. Appl. No. 15/866,323, dated Oct. 1, 2018, 121 pages.
Notice of Allowance and Search Report from foreign counterpart Taiwan Patent Application No. 103109479, dated Nov. 30, 2017, 4 pages. (Translation available only for Search report).
Notice of Allowance from foreign counterpart Chinese Patent Application No. 200780046679, dated Feb. 6, 2017, 8 pages.
Notice of Allowance from foreign counterpart Korean Patent Application No. 10-2015-7029262, dated Aug. 31, 2017, 3 pages.
Notice of Allowance from foreign counterpart Korean Patent Application No. 10-2016-7017150, dated Oct. 30, 2017, 3 pages.
Notice of Allowance from foreign counterpart Korean Patent Application No. 10-2017-7002379, dated Dec. 20, 2017, 3 pages.

(56) References Cited

OTHER PUBLICATIONS

Notice of Allowance from foreign counterpart Korean Patent Application No. 10-2017-7002473, dated Dec. 20, 2017, 6 pages.
Notice of Allowance from foreign counterpart Korean Patent Application No. 20137027841, dated Mar. 31, 2016, 2 pages.
Notice of Allowance from U.S. Appl. No. 12/296,919, dated Jul. 27, 2012, 6 pages.
Notice of Allowance from U.S. Appl. No. 12/514,303, dated Oct. 25, 2013, 12 pages.
Notice of Allowance from U.S. Appl. No. 13/428,438, dated Apr. 13, 2017, 62 pages.
Notice of Allowance from U.S. Appl. No. 13/428,438, dated Aug. 7, 2017, 42 pages.
Notice of Allowance from U.S. Appl. No. 13/428,438, dated Aug. 10, 2016, 9 pages.
Notice of Allowance from U.S. Appl. No. 13/428,438, dated Dec. 29, 2016, 9 pages.
Notice of Allowance from U.S. Appl. No. 13/428,438, dated Mar. 4, 2016, 14 pages.
Notice of Allowance from U.S. Appl. No. 13/428,438, dated Nov. 6, 2015, 9 pages.
Notice of Allowance from U.S. Appl. No. 13/428,440, dated Feb. 26, 2016, 10 pages.
Notice of Allowance from U.S. Appl. No. 13/428,440, dated Nov. 16, 2016, 9 pages.
Notice of Allowance from U.S. Appl. No. 13/428,440, dated Nov. 20, 2015, 9 pages.
Notice of Allowance from U.S. Appl. No. 13/428,452, dated Oct. 21, 2015, 9 pages.
Notice of Allowance from U.S. Appl. No. 13/475,708, dated Jun. 16, 2017, 51 pages.
Notice of Allowance from U.S. Appl. No. 13/475,708, dated Jun. 30, 2017, 53 pages.
Notice of Allowance from U.S. Appl. No. 13/475,708, dated Mar. 17, 2017, 55 pages.
Notice of Allowance from U.S. Appl. No. 13/475,708, dated Nov. 27, 2017, 24 pages.
Notice of Allowance from U.S. Appl. No. 13/475,708, dated Oct. 13, 2016, 17 pages.
Notice of Allowance from U.S. Appl. No. 13/475,739, dated Aug. 3, 2016, 11 pages.
Notice of Allowance from U.S. Appl. No. 13/475,739, dated Mar. 25, 2016, 25 pages.
Notice of Allowance from U.S. Appl. No. 13/691,609, dated Aug. 6, 2014, 11 pages.
Notice of Allowance from U.S. Appl. No. 13/691,609, dated Feb. 23, 2015, 16 pages.
Notice of Allowance from U.S. Appl. No. 13/824,013, dated Jul. 23, 2018, 15 pages.
Notice of Allowance from U.S. Appl. No. 13/824,013, dated Sep. 19, 2018, 6 pages.
Notice of Allowance from U.S. Appl. No. 14/194,589, dated Jul. 27, 2016, 7 pages.
Notice of Allowance from U.S. Appl. No. 14/213,115, dated Jun. 27, 2016, 9 pages.
Notice of Allowance from U.S. Appl. No. 14/213,115, dated Oct. 3, 2016, 20 pages.
Notice of Allowance from U.S. Appl. No. 14/213,135, dated Aug. 3, 2017, 103 pages.
Notice of Allowance from U.S. Appl. No. 14/213,135, dated Oct. 17, 2016, 17 pages.
Notice of Allowance from U.S. Appl. No. 14/213,218, dated Jun. 16, 2017, 89 pages.
Notice of Allowance from U.S. Appl. No. 14/213,692, dated Dec. 23, 2016, 19 pages.
Notice of Allowance from U.S. Appl. No. 14/213,692, dated Sep. 28, 2017, 112 pages.
Notice of Allowance from U.S. Appl. No. 14/213,730, dated Aug. 31, 2017, 96 pages.
Notice of Allowance from U.S. Appl. No. 14/213,730, dated Oct. 27, 2016, 16 pages.
Notice of Allowance from U.S. Appl. No. 14/213,854, dated Oct. 7, 2016, 19 pages.
Notice of Allowance from U.S. Appl. No. 14/214,045, dated Apr. 18, 2017, 88 pages.
Notice of Allowance from U.S. Appl. No. 14/214,045, dated Oct. 6, 2017, 137 pages.
Notice of Allowance from U.S. Appl. No. 14/214,176, dated May 10, 2017, 88 pages.
Notice of Allowance from U.S. Appl. No. 14/214,176, dated Oct. 19, 2017, 25 pages.
Notice of Allowance from U.S. Appl. No. 14/215,633, dated Mar. 23, 2017, 17 pages.
Notice of Allowance from U.S. Appl. No. 14/215,633, dated May 23, 2016, 9 pages.
Notice of Allowance from U.S. Appl. No. 14/215,633, dated Oct. 4, 2017, 15 pages.
Notice of Allowance from U.S. Appl. No. 14/215,633, dated Sep. 29, 2016, 13 pages.
Notice of Allowance from U.S. Appl. No. 14/216,493, dated Aug. 1, 2018, 14 pages.
Notice of Allowance from U.S. Appl. No. 14/216,493, dated Aug. 4, 2017, 95 pages.
Notice of Allowance from U.S. Appl. No. 14/216,859, dated Dec. 1, 2017, 113 pages.
Notice of Allowance from U.S. Appl. No. 14/216,859, dated Jan. 24, 2017, 17 pages.
Notice of Allowance from U.S. Appl. No. 14/360,284, dated Jun. 14, 2017, 100 pages.
Notice of Allowance from U.S. Appl. No. 14/733,827, dated Sep. 22, 2017, 30 pages.
Notice of Allowance from U.S. Appl. No. 15/019,920, dated Dec. 6, 2017, 24 pages.
Notice of Allowance from U.S. Appl. No. 15/019,920, dated Jul. 14, 2017, 100 pages.
Notice of Allowance from U.S. Appl. No. 15/082,359, dated Mar. 21, 2018, 9 pages.
Notice of Allowance from U.S. Appl. No. 15/082,867, dated Dec. 22, 2017, 25 pages.
Notice of Allowance from U.S. Appl. No. 15/219,063, dated Mar. 19, 2018, 28 pages.
Notice of Allowance from U.S. Appl. No. 15/257,593, dated Oct. 11, 2017, 95 pages.
Notice of Allowance from U.S. Appl. No. 15/357,943, dated Jan. 16, 2018, 16 pages.
Notice of Allowance from U.S. Appl. No. 15/408,255, dated Jul. 25, 2018, 136 pages.
Notice of Allowance from U.S. Appl. No. 15/408,269, dated Sep. 24, 2018, 137 pages.
Notice of Final Rejection from foreign counterpart Korean Patent Application No. 10-2015-7029262, dated May 23, 2017, 7 pages.
Notice of Preliminary Rejection from foreign counterpart Korean Patent Application No. 10-2016-7017150, dated Apr. 20, 2017, 5 pages.
Notice of Preliminary Rejection from foreign counterpart Korean Patent Application No. 10-2018-7003058, dated Jun. 4, 2018, 10 pages.
Notice on Grant of Patent Right for Invention from foreign counterpart China Application No. 201180076244.2, dated Aug. 28, 2017, 4 pages.
Notice on Grant of Patent Right for Invention from foreign counterpart Chinese Patent Application No. 201180076248.0, dated Feb. 27, 2018, 6 pages.
Notice on Grant of Patent Right for Invention from foreign counterpart Chinese Patent Application No. 201280024012.7, dated Mar. 12, 2018, 4 pages.
Notice on Grant of Patent Right for Invention from foreign counterpart Chinese Patent Application No. 201280024054.0, dated Dec. 1, 2017, 4 pages.
Notice on Grant of Patent Right for Invention from foreign counterpart Chinese Patent Application No. 201280024095.X, dated Nov. 7, 2017, 6 pages.

(56) References Cited

OTHER PUBLICATIONS

Notification of Reason for Refusal from Foreign Counterpart Korean Patent Application No. 10-2013-7027842, dated Sep. 18, 2015, 7 pages.
Notification of Reason for Refusal from foreign counterpart Korean Patent Application No. 10-2014-7016774, dated Jan. 28, 2016, 4 pages.
Notification of Reason for Refusal from foreign counterpart Korean Patent Application No. 10-2017-7002473, dated May 26, 2017, 7 pages.
Notification of Reason for Refusal from foreign counterpart Korean Patent Application No. 20137027841, dated Sep. 18, 2015, 10 pages.
Notification of Reason for Refusal from foreign counterpart Korean Patent Application No. 20137033565, dated Sep. 30, 2015, 6 pages.
Notification of Reason for Refusal from foreign counterpart Korean Patent Application No. 20137033566, dated Sep. 30, 2015, 9 pages.
Notification of Reason for Refusal from foreign counterpart Korean Patent Application No. KR1020137027843, dated Sep. 30, 2015, 8 pages.
Notification of Reason for Refusal from foreign counterpart Korean Patent Application No. KR1020157029107, dated Oct. 13, 2016, 11 pages.
Notification to Grant Patent Right for Invention from foreign counterpart China Patent Application No. 201180076245.7, dated Nov. 2, 2016, 3 pages.
Notification to Grant Patent Right for Invention from foreign counterpart China Patent Application No. CN201280034725, dated Aug. 12, 2016, 3 pages.
Notification to Grant Patent Right for Invention from foreign counterpart China Patent Application No. CN201310589048, dated May 5, 2016, 3 pages.
Nuth et al., "The Named-State Register File: Implementation and Performance," High-Performance Computer Architecture, First IEEE Symposium, Jan. 22-25, 1995, 10 pages.
Office Action and Search Report from foreign counterpart Taiwan Patent Application No. 100142885, dated Jan. 23, 2017, 12 pages.
Office Action and Search Report from foreign counterpart Taiwan Patent Application No. 101117854, dated Mar. 30, 2017, 7 pages.
Office Action from foreign counterpart Chinese Patent Application No. 200780046679, dated May 21, 2013, 14 pages.
Office Action from foreign counterpart Chinese patent application No. 201280024012, dated Feb. 3, 2017, 20 pages.
Office Action from foreign counterpart Chinese patent application No. 201280024095, dated Feb. 4, 2017, 31 pages.
Office Action from foreign counterpart European Patent Application No. EP12764838, dated Oct. 4, 2016, 4 pages.
Office Action from foreign counterpart Taiwan Patent Application No. 20140109479, dated Nov. 28, 2016, 7 pages.
Partial European Search Report for Application No. 12174229, dated Oct. 10, 2012, 7 pages.
Partial Supplementary European Search Report for Application No. 14769450.9, dated Oct. 11, 2016, 8 pages.
Partial Supplementary European Search Report for Application No. EP14770976.0, dated Mar. 24, 2017, 7 pages.
Extended European Search Report for Application No. 14770976.0, dated Jul. 3, 2017, 9 pages.
First Office Action and Search report from foreign counterpart China Patent Application No. 201180076248.0, dated Mar. 17, 2016, 25 pages.
First Office Action and Search report from foreign counterpart Chinese Patent Application No. 201180076244.2, dated Mar. 22, 2016, 18 pages (Translation available only for Office Action).
First Office Action from foreign counterpart China Patent Application No. 201280024012.7, dated May 30, 2016, 21 pages.
Grant of Patent for Korean Application No. 10-2014-7016763, dated Oct. 31, 2016, 2 pages.
Grant of Patent for Korean Application No. 10-2015-7028745, dated Nov. 30, 2016, 2 pages.

Intel "Programming on Intel® Platform," the edition team of Intel® Software College course book, Shanghai Jiao Tong University Press, published Jan. 31, 2011, pp. 175-180.
Notification of Reason for Refusal from foreign counterpart Korean Patent Application No. 10-2015-7029262, dated Oct. 17, 2016, 12 pages.
Notification of Reason for Refusal from foreign counterpart Korean Patent Application No. 10-2017-7002379, dated May 26, 2017, 6 pages.
Notification of Reason for Refusal from Korean Application No. 10-2014-7016763, dated Apr. 29, 2016, 11 pages.
Notification of Reason for Refusal from Korean Application No. 10-2015-7028745, dated May 23, 2016, 8 pages.
Second Office Action from foreign counterpart China Patent Application No. 201180076248.0, dated Oct. 20, 2016, 25 pages.
Communication pursuant to Rules 70(2) and 70a(2) EPC for European Application No. 11876314.3, dated Jul. 1, 2016, 1 page.
Non-Final Office Action from U.S. Appl. No. 14/212,533, dated Apr. 20, 2017, 116 pages.
Notice of Allowance from U.S. Appl. No. 13/428,440, dated Apr. 20, 2017, 46 pages.
Third Office Action and Search report from foreign counterpart China Patent Application No. 201180076248.0, dated May 2, 2017, 27 pages.
Third Office Action from foreign counterpart Chinese Patent Application No. 201180076244.2, dated May 2, 2017, 20 pages.
Restriction Requirement from U.S. Appl. No. 12/296,919, dated Feb. 8, 2011, 4 pages.
Restriction Requirement from U.S. Appl. No. 12/514,303, dated Oct. 15, 2012, 4 pages.
Restriction Requirement from U.S. Appl. No. 14/360,282, dated Jul. 28, 2016, 4 pages.
Rixner, et al., "Register Organization for Media Processing," HPCA-6—Proceedings of the 6th International Symposium on High-Performance Computer Architecture, Jan. 8-12, 2000, IEEE, Toulouse, France, pp. 375-386.
Rotenberg E., et al., "Trace Cache: a Low Latency Approach to High Bandwidth Instruction Fetching," MICRO 29—Proceedings of the 29th annual ACM/IEEE international symposium on Microarchitecture, IEEE Computer Society, Apr. 11, 1996, 48 pages.
Santos, et al., "The 2D-VLIW Architecture," Technical Report IC-06-006, Instituto de Computacao, Universidad Estadual de Campinas, Mar. 2006, 13 pages.
Sassone et al., "Dynamic Strands: Collapsing Speculative Dependence Chains for Reducing Pipeline Communication," Microarchitecture, IEEE, 37th International Symposium on Portland, USA Dec. 4, 2004, pp. 7-17, Piscataway, NJ, USA.
Search Report for Chinese Application No. CN201280024012, dated May 19, 2016, 2 pages.
Second Office Action from foreign counterpart China Patent Application No. 201480024463.X, dated Nov. 14, 2017, 34 pages.
Second Office Action from foreign counterpart China Patent Application No. CN201280034725, dated Apr. 14, 2016, 8 pages.
Second Office Action from foreign counterpart China Patent Application No. CN201280034739, dated Jun. 23, 2016, 44 pages.
Second Office Action from foreign counterpart Chinese Patent Application No. 201280024054.0, dated Dec. 26, 2016, 11 pages.
Second Office Action with search report from foreign counterpart Chinese Patent Application No. 201180076244, dated Nov. 18, 2016, 21 pages (Translation available only for Office Action).
First Examination Report from foreign counterpart Indian Patent Application No. 51/KOLNP/2012, dated Jul. 30, 2018, 7 pages.
Non-Final Office Action from U.S. Appl. No. 15/408,323, dated Oct. 9, 2018, 144 pages.
Non-Final Office Action from U.S. Appl. No. 15/853,323, dated Aug. 28, 2018, 115 pages.
Notice of Allowance from U.S. Appl. No. 14/213,135, dated Oct. 3, 2018, 34 pages.
Notice of Allowance from U.S. Appl. No. 14/216,493, dated Apr. 2, 2018, 22 pages.
Notice of Allowance from U.S. Appl. No. 14/360,284, dated Oct. 12, 2018, 45 pages.

(56) References Cited

OTHER PUBLICATIONS

Notice of Allowance from U.S. Appl. No. 15/408,311, dated Aug. 28, 2018, 138 pages.
Notice of Allowance from U.S. Appl. No. 15/712,017, dated Oct. 3, 2018, 16 pages.
Corrected Notice of Allowance from U.S. Appl. No. 15/219,063, dated Jun. 28, 2018, 8 pages.
Notice of Allowance from U.S. Appl. No. 13/428,440, dated Mar. 10, 2017, 52 pages.
Notice of Allowance from U.S. Appl. No. 14/214,280, dated Jun. 29, 2017, 86 pages.
Notice of Allowance from U.S. Appl. No. 14/215,633, dated Jun. 30, 2017, 83 pages.
Notice of Allowance from U.S. Appl. No. 15/082,867, dated Jul. 7, 2017, 98 pages.
Summons to attend Oral Proceedings for European Application No. 070864410, dated Apr. 3, 2013, 3 pages.
Sun, et al., "Modeling of FPGA Local/Global Interconnect Resources and Derivation of Minimal Test Configuration," Proceedings of the 17th IEEE International Symposium on Defect and Fault Tolerance in VLSI Systems (DFT'02), IEEE Computer Society, Nov. 6-8, 2002, 9 pages.
Third Office Action from foreign counterpart China Patent Application No. 201280024054.0, dated Jul. 28, 2017, 8 pages.
Third Office Action from foreign counterpart Chinese Patent Application No. 201280024012.7, dated Nov. 6, 2017, 8 pages.
Third Office Action from foreign counterpart Chinese Patent Application No. 201280034739, dated Dec. 27, 2016, 18 pages.
Wallace S., et al.,"Multiple Branch and Block Prediction," Third International symposium on High-Performance Computer Architecture, IEEE, Feb. 1997, pp. 94-103.
Written Opinion for Application No. PCT/US2007/066536, dated Jul. 30, 2008, 5 pages.
Ye, et al., "A New Recovery Mechanism in Superscalar Microprocessors by Recovering Critical Misprediction," IEICE Transactions on Fundamentals of Electronics, Communications and Computer Sciences, the Institute of Electronics, Information and Communication Engineers, Dec. 1, 2011, vol. E94-A (12), pp. 2639-2648.
Yeh, et al., "Increasing the Instruction Fetch Rate Via Multiple Branch Prediction and a Branch Address Cache," ICS '93, Proceedings of the 7th International Conference on Supercomputing, ACM, New York, NY, Jul. 19-23, 1993, pp. 67-76.
Abandonment from U.S. Appl. No. 14/360,280, dated Apr. 4, 2019, 2 pages.
Allowance Decision of Examination from foreign counterpart Taiwan Patent Application No. 106127331, dated Apr. 9, 2019, 3 pages.
Communication pursuant to Article 94(3) EPC for European Application No. 14770976.0, dated Feb. 18, 2019, 4 pages.
Communication Pursuant to Article 94(3) EPC for European Application No. 12763717.1, dated Mar. 22, 2019, 7 pages.
Communication Pursuant to Article 94(3) EPC for European Application No. 16196777.3, dated Feb. 28, 2019, 5 pages.
Final Office Action from U.S. Appl. No. 15/408,323, dated Feb. 28, 2019, 18 pages.
Notice of Allowance from U.S. Appl. No. 15/354,742, dated Mar. 26, 2019, 24 pages.
Second Office Action from foreign counterpart Chinese Patent Application No. 201480024832.5, dated Apr. 2, 2019, 10 pages.
Communication pursuant to Article 94(3) EPC, EP App. No. 14769411.1, dated May 4, 2020, 5 pages.
Office Action, IN App No. 5500/CHENP/2015, dated Feb. 18, 2020, 6 pages.

* cited by examiner

103B

| FFTB Address | Offset of FFTB | Guest/Native ID | Direct/Indirect ID |
|---|---|---|---|
|  |  |  |  |
|  |  |  |  |
| . | . | . | . |
| . | . | . | . |
| . | . | . | . |
|  |  |  |  |

Figure 1C

METHODS, SYSTEMS AND APPARATUS FOR SUPPORTING WIDE AND EFFICIENT FRONT-END OPERATION WITH GUEST-ARCHITECTURE EMULATION

RELATED APPLICATIONS

This application is a continuation of U.S. patent application Ser. No. 14/216,493, filed Mar. 17, 2014, which application claims priority to U.S. Provisional Patent Application Ser. No. 61/799,717, filed on Mar. 15, 2013, entitled "A method and apparatus for a wide and efficient front-end to emulate a guest architecture," which are hereby incorporated by reference in their entirety.

International Application No. PCT/US2011/051992 is incorporated herein by reference for all purposes: "Single Cycle Multi-Branch Prediction Including Shadow Cache for Early Far Branch Prediction," Mohammad Abdallah, filed on Sep. 16, 2011.

BACKGROUND

A central processor unit (CPU) also referred to as a processor, is the hardware within a computer that carries out the instructions of a computer program by performing the basic arithmetical, logical, and input/output operations of the system. Conventional processors can have a variety of architecture features that can include but are not limited to wide architectures, pipelined architectures and emulated architectures.

Processors that have wide architectures are capable of fetching and decoding multiple cache lines of instructions in parallel. In order to optimally support such wide architectures the processor frontend must be capable of supplying multiple cache lines of instructions to the processor scheduler and execution units during each clock cycle.

Processors that feature emulation allow software applications and operating systems written for other computer processor architectures to be run on the processors. Such processors have the capacity to duplicate (or emulate) the functions of another computer system (the guest architecture) such that the behavior emulated by the processors closely resembles the behavior of the other computer system (the guest architecture).

In emulated architectures, both native and guest branch (instructions) can be encountered. Native-branch instructions are branch instructions whose target is an address in the native-space. Guest-branch instructions are branch instructions whose target is an address in guest-space. Accordingly, a hardware structure such as a conversion-lookaside-buffer (CLB) is required to maintain the mapping of guest-to-native addresses.

In addition to native and guest branches, processors can encounter a variety of branch instruction types that can present challenges as regards supplying multiple cache-lines of instructions to the processors' scheduler and execution units during each clock cycle (because of complex program control flows). Such instructions can include what are termed "far branch" instructions and "near branch" instructions (e.g., loop instructions). Far branch instructions are instructions that can alter the flow of instruction execution in a program wherein instruction execution jumps outside of a cache line. Loop instructions are instructions that include a sequence of statements that are specified only once but that are carried out several times in succession before the loop is exited (and can involve jumps within a cache line).

In pipelined architectures multiple sequential instructions are executed simultaneously. However, the pipeline can only be fully utilized if the processor is able to read a next instruction from memory on every cycle. Importantly, the processor must know which instruction is to be next read in order to read that instruction. However, when a far branch instruction is encountered, the processor may not know ahead of time the path that will be taken and thus which instruction is to be next read. In such instances, the processor has to stall until this issue can be resolved. This process can degrade utilization and negatively impact processor performance.

Additionally, in some conventional processors, when a loop is encountered, instructions of the loop that are required to be repeated in successive iterations of the loop may need to be accessed in different clock cycles. This requirement can limit the number of instructions that can be forwarded per cycle. Accordingly, such processors can exhibit unsatisfactory latencies attributable to the delays in reading instructions from memory.

SUMMARY

In some conventional processors when a conditional branch instruction is encountered, it may not be known ahead of time which path will be taken and thus which instruction is to be read. In such instances, the CPU has to stall until the decision is resolved. This can degrade utilization and negatively impact processor performance. Additionally, in some conventional processors when a loop is encountered, the number of instructions that can be forwarded per cycle can be limited. Accordingly, such systems can exhibit unsatisfactory latencies that are attributable to delays in reading instructions from memory. Methods for a wide and efficient front-end operation with guest architecture emulation are disclosed that addresses these shortcomings. However, the claimed embodiments are not limited to implementations that address any or all of the aforementioned shortcomings. As a part of a method for wide and efficient front-end operation, upon receiving a request to fetch a first far taken branch instruction, a first cache line that includes the first far taken branch instruction, a next cache line and a cache line that is located at the target of the first far taken branch instruction is read. Based on information accessed from a data table, the first cache line and either the next cache line or the cache line at the target is fetched in a single cycle.

In the same or another embodiment, as a part of a method for wide and efficient front-end operation, (a) responsive to a request to fetch an instruction, it is determined if an instruction is to be successively accessed as a part of a loop; if the instruction is to be successively accessed, (b) a first cache line comprising the instruction is duplicated to provide a duplicated cache line, and the first cache line and the duplicated cache line are forwarded; (c) then it is determined if an instruction of the duplicated cache line has characteristics that correspond to a stored instruction tag that identifies an exit branch associated with the loop; (d) if the instruction of the duplicated cache line has characteristics that correspond to the stored instruction tag that identifies the exit branch, the loop is exited, and if the instruction of the duplicated cache line does not have characteristics that correspond to the stored instruction tag that identifies the exit branch return to (b). Based on the aforementioned operations, exemplary embodiments facilitate the maintenance of efficient processor frontend supply of multiple cache lines of instructions to the processor scheduler and execution units during each clock cycle, even where first far taken branches and loops are encountered.

BRIEF DESCRIPTION OF THE DRAWINGS

The invention, together with further advantages thereof, may best be understood by reference to the following description taken in conjunction with the accompanying drawings in which:

FIG. 1C shows an exemplary first far taken branch data table (FFTB DT) according to one embodiment.

It should be noted that like reference numbers refer to like elements in the figures.

DETAILED DESCRIPTION

Figure 1A:
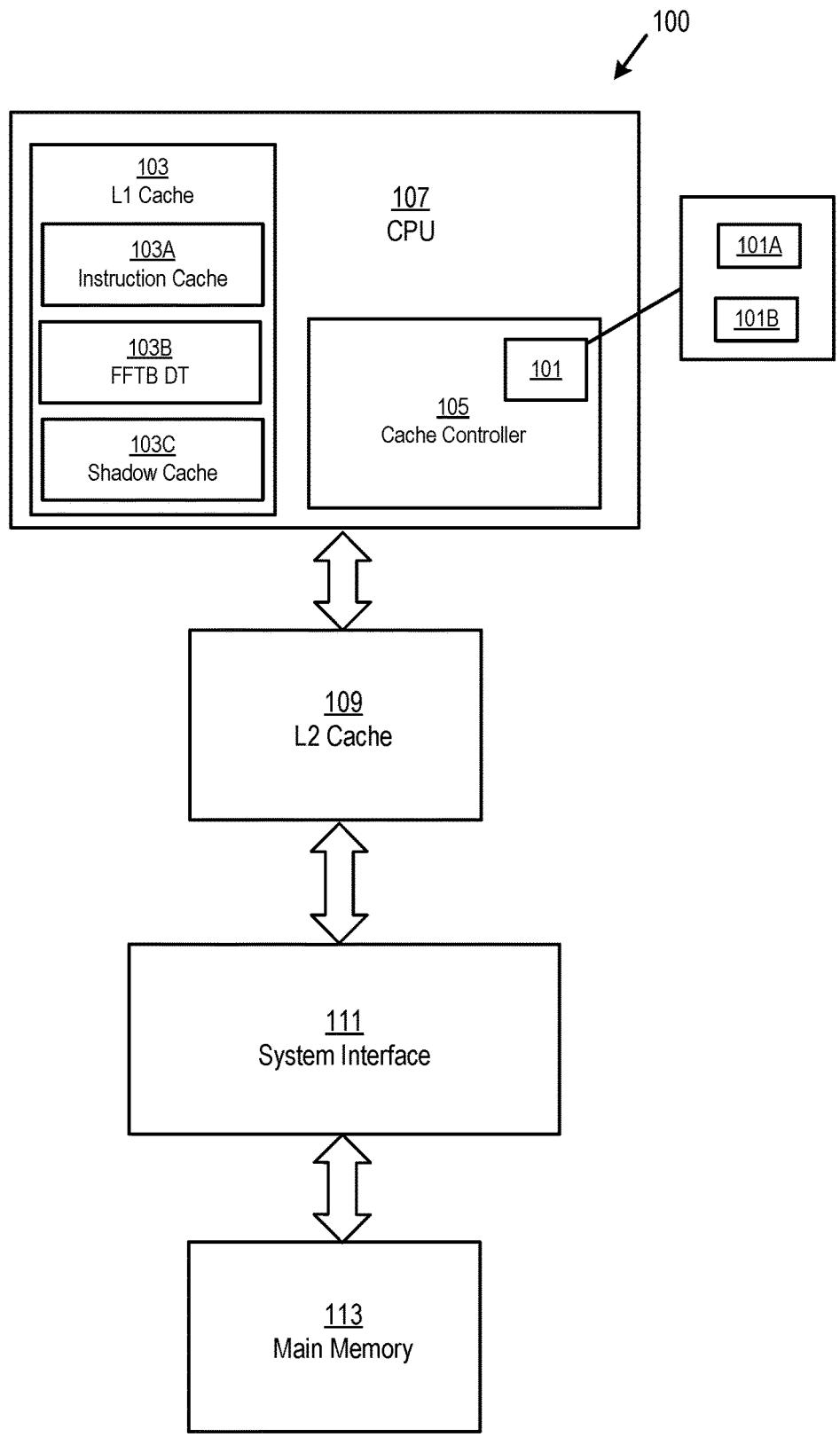
FIG. 1A shows an exemplary operating environment of a system for supporting wide and efficient front-end operation with guest-architecture emulation according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading" or "fetching" or "computing" or "determining" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Exemplary Operating Environment of Systems and Apparatus for Supporting Wide and Efficient Front-End Operation with Guest-Architecture Emulation According to One Embodiment FIG. 1A shows an exemplary operating environment 100 of a system 101 for supporting wide and efficient front-end operation with guest-architecture emulation according to one embodiment. System 101 includes subsystems 101A and 101B. Subsystem 101A uses data that is maintained in an information cache to determine whether a first cache line and a non-consecutive cache line (located at the first far taken branch target address and copied into a shadow cache) or the first cache line and a cache line that follows the first cache line are to be fetched. Subsystem 101B identifies cache lines that contain dynamically taken branches, and duplicates such cache lines, such that these cache lines and their duplicate cache lines can be forwarded together in pairs. Moreover, subsystem 101B determines the point at which a loop that involves one or more cache line pairs is exited by referencing an exit branch instruction identifying table. A matching tag in the table indicates that a branch instruction of a duplicate cache line is to be treated as the exit branch of the loop. Based on the aforementioned operations, systems 101A and 101B facilitate the maintenance of efficient processor frontend supply of multiple cache lines of instructions to the processor scheduler and execution units during each clock cycle, even where first far taken branches and loops are encountered (discussed herein in detail below). FIG. 1A shows system 101, first far taken branch managing system 101A, loop managing system 101B, level one (L1) cache 103, instruction cache 103a, first far taken branch data table (FFTB DT) 103b, shadow cache 103c, cache controller 105, CPU 107, level two (L2) cache 109, system interface 111 and main memory 113.

Figure 1B:
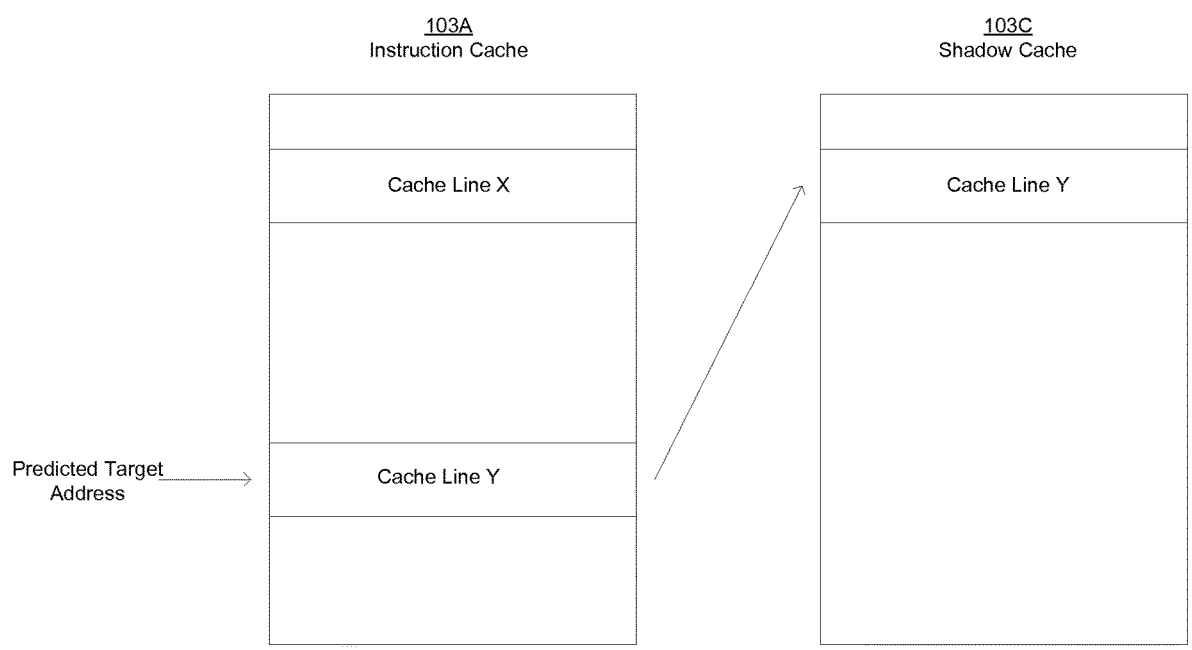
FIG. 1B shows an instruction cache and a shadow cache that stores a copy of a cache line that is copied from a target of a first far taken branch instruction according to one embodiment.

Referring to FIG. 1A, level one (L1) cache 103 is the primary cache of CPU 107 and is static memory which can be integrated with the processor core. Moreover, L1 cache 103 is used to store information that has been recently accessed by CPU 107. In one embodiment, L1 cache 103 can include instruction cache 103a, first far taken branch data table (FFTB DT) 103b and shadow cache 103c. In one embodiment, instruction cache 103a stores executable instructions of programs that can include first far taken branch (FFTB) instructions. And, shadow cache 103c stores copies of the cache lines that are stored at the target addresses of FFTB instructions of application programs. For example, as shown in FIG. 1B, shadow cache 103c can store a copy of a cache line Y that is stored at the predicted target address of a FFTB instruction of cache line X. Moreover, because cache line Y is stored in the same index in shadow cache 103c as is the FFTB instruction that is stored in instruction cache 103a, these non-consecutive cache lines can be fetched in the same clock cycle and can be forwarded together (such as to the processor scheduler and execution units). In one embodiment, shadow cache 103c can have the same number of sets and half the number of ways as does instruction cache 103a. In other embodiments, other configurations of shadow cache 103c with different numbers of sets and ways can be used.

As regards, FFTB DT 103b, in one embodiment, as shown in FIG. 1C, the FFTB DT 103b stores data that can include but is not limited to FFTB target addresses (the addresses of the cache lines where instruction fetch restarts after the fetch of the cache lines that contain the FFTB), instruction offsets of FFTB target addresses, guest/native instruction identifiers and direct/indirect instruction identifiers. In one embodiment, when a cache line is brought from L2 cache 109 and placed into L1 cache 103 the aforementioned data can be decoded from the cache line and placed into FFTB DT 103b.

In one embodiment, based on a FFTB target address that is calculated and cached in FFTB DT 103b, when a cache line that contains an FFTB is fetched, the cache line at the cached target address is fetched from shadow cache 103c as the second cache line (as opposed to the cache line that follows the cache line that contains the FFTB as part of a consecutive code fetch) as is described in detail herein below.

Referring again to FIG. 1A, cache controller 105 includes the logic used to control cache memory units and to carry out predetermined cache policies. In one embodiment, systems 101a and 101b, described herein in detail below, and their functionality can be provided as a part of cache controller 105. In other embodiments, system 101a and system 101b, or components thereof, can be separate from cache controller 105.

Level 2 cache 109 is secondary cache but like L1 cache 103 is used to store recently accessed information. In one embodiment, as discussed above, a cache-line that is stored in L2 cache 109 can be brought from L2 cache 109 and placed into L1 cache 103. Moreover, as discussed above, when the cache line is brought from L2 cache 109, data can be decoded from the cache line and placed into FFTB DT 103b.

Also shown in FIG. 1A is main memory 113 and system interface 111. Main memory 113 includes physical addresses that store information that can be copied into cache memory and system interface 111 facilitates the transfer of data between main memory 113 and L2 cache 109.

First Far Taken Branch Managing Subsystem

Figure 1D:
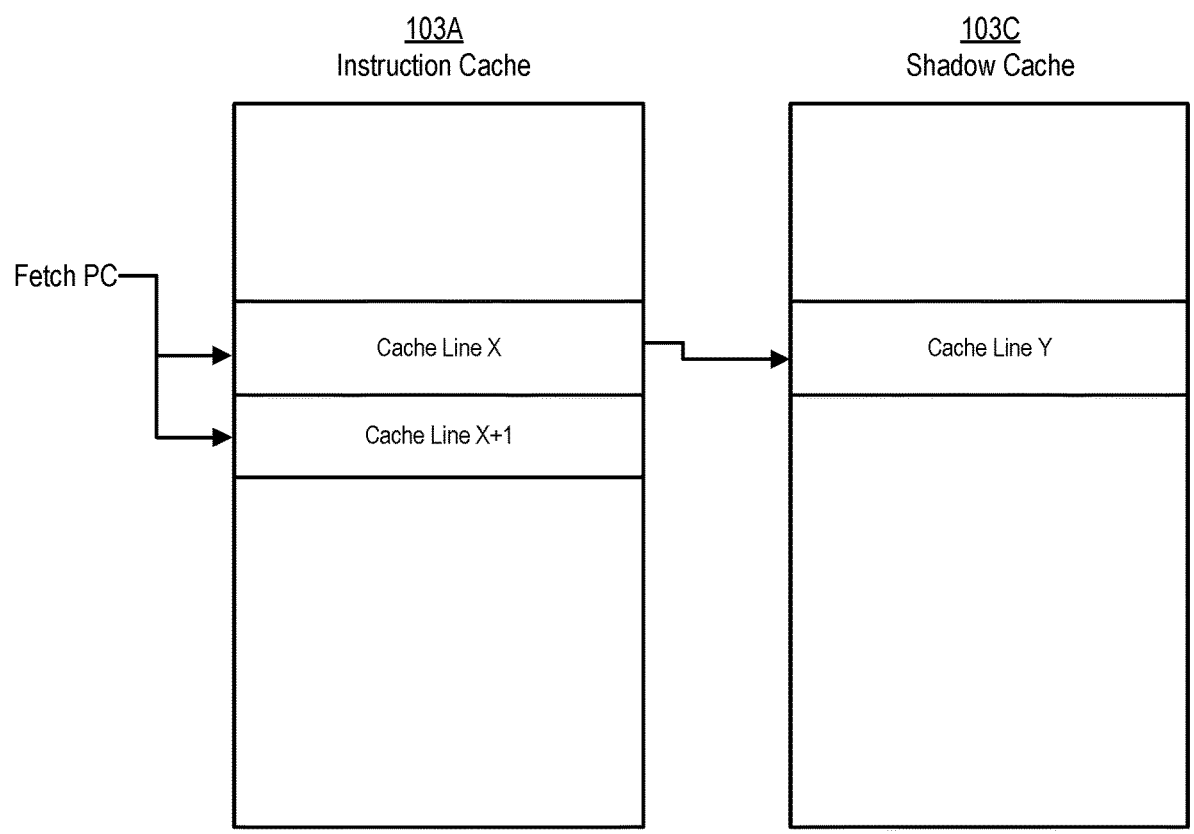
FIG. 1D illustrates a reading of a first cache line which contains a first far taken branch, a next cache line and a target cache line according to one embodiment.

Referring to FIG. 1A, system 101A enables the forwarding of multiple cache lines of instructions to the processor scheduler and execution units (not shown) during each cycle, even where first far taken branches are encountered. In one embodiment, system 101A uses data that is maintained in FFTB DT 103b to determine whether a first cache line (that contains a first far taken branch) and a cache line stored in shadow cache 103c (that is a copy of a cache line that is stored at the target of the first far taken branch) or a first cache line and a cache line that follows the first cache line are fetched. More specifically, referring to FIG. 1D, as a part of its operation, system 101A, upon receiving a request to fetch a first far taken branch instruction, reads a first cache line (cache line X) which contains the first far taken branch instruction, a next cache line (cache line X+1) and a cache line (cache line Y) that is stored in shadow cache 103c that is a copy of the cache line stored at the first far taken branch instruction target address. Thereafter, system 101 fetches the first cache line (cache line X) and either the next cache line (cache line X+1) or the cache line (cache line Y) stored in shadow cache 103c based on information accessed from FFTB DT 103b.

Figure 1E:
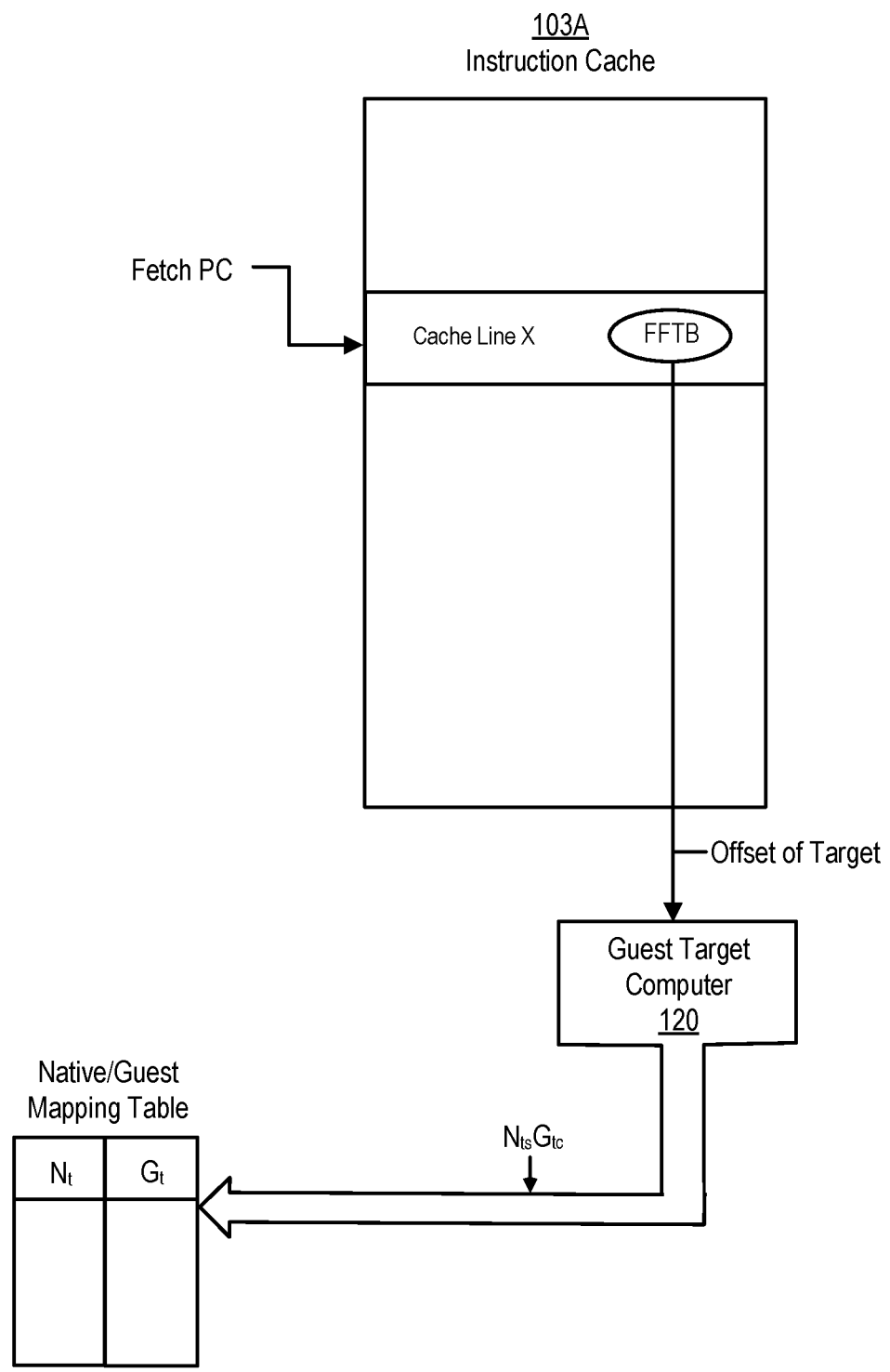
FIG. 1E illustrates how the offset of a target instruction is extracted from the first far taken branch according to one embodiment.

As shown in FIG. 1E, in order to confirm that the target address that is stored in FFTB DT 103b is valid, system 101A accesses the offset of the first far taken branch instruction in the cache line X from FFTB DT 103B, and using this offset, extracts from the first far taken branch the offset of the target. Thereafter, guest target computer 120 computes a guest target address based on the offset of the target instruction and data that is provided by the guest instruction pointer (not shown in FIG. 1E). The computed guest target address $G_{tc}$ and the native target address $N_{ts}$ that is stored in FFTB DT 103b are forwarded together to native/guest target mapping table 122 (e.g., conversion-lookaside-buffer-CLB). There, a comparison of these addresses with the current mapping of the guest target address $G_{tm}$ and the native target address $N_{tm}$ that is present in native/guest target mapping table 122 is made in order to determine if the computed guest target address $G_{tc}$ and the stored native target address $N_{ts}$ are valid (see FIG. 1E). In one embodiment, a confirmation of the validity of this data is made each time a cache line containing a first far taken branch and the cache line stored at its target address are fetched (because the cache line previously stored at the target address may have been replaced with another cache line during the period between fetches).

Figure 1F:
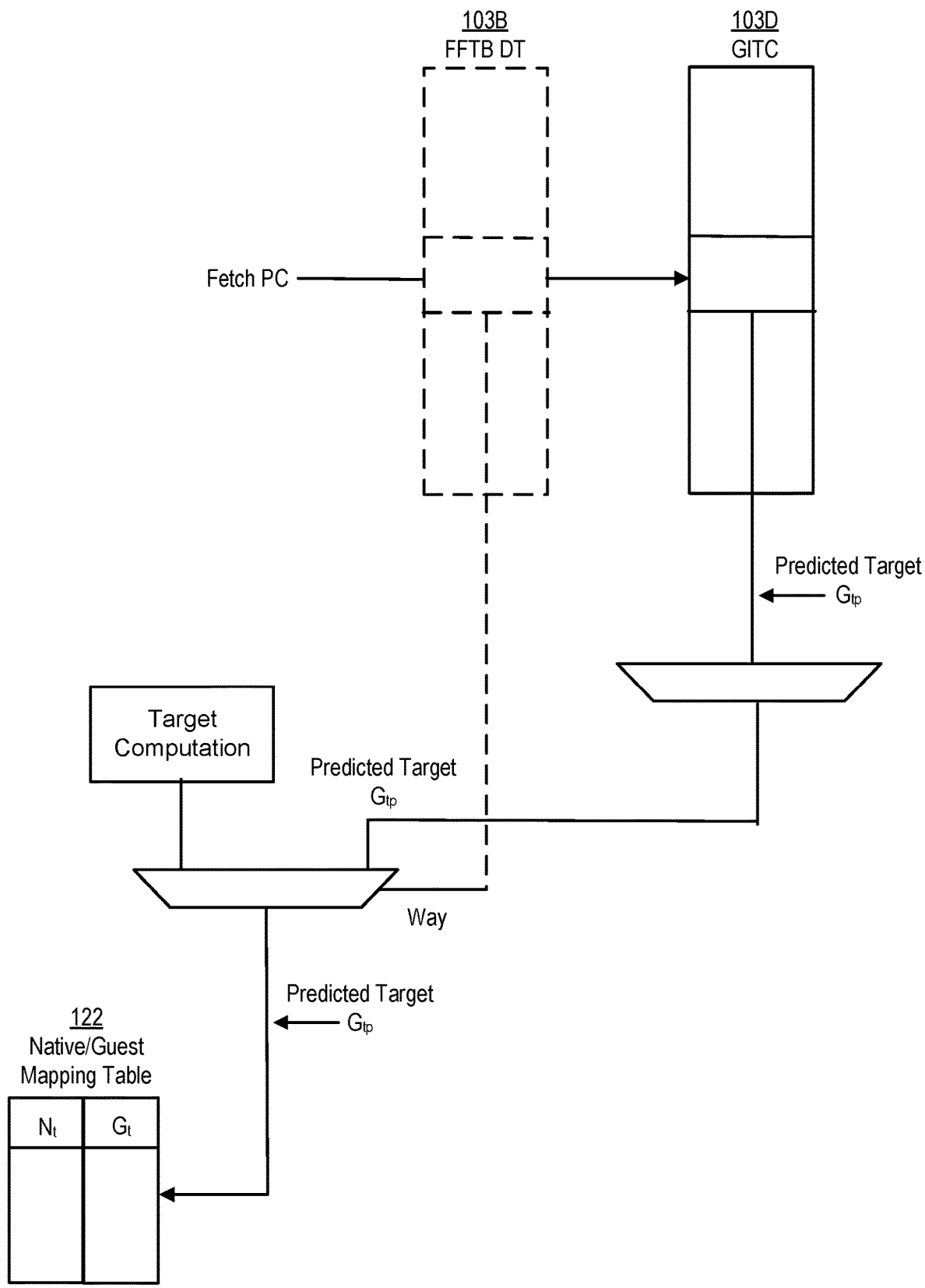
FIG. 1F shows a use of a guest indirect target cache (GITC) according to one embodiment.

In one embodiment, when the location of a guest branch instruction is not a function of the current guest instruction pointer (e.g., the guest branch instruction is a guest indirect branch instruction), an additional caching structure, referred to herein as a "guest indirect target cache" (GITC) 103d, can be used to store a predicted guest target address of the guest indirect branch instruction as is shown in FIG. 1F. In one embodiment, GITC can be provided as a part of L1 cache 103. In one embodiment, FFTB-DT 103b can store information that can be used to identify a branch instruction as a guest indirect branch instruction. Moreover, in one embodiment, FFTB-DT 103b can also store information that identifies the way in which the predicted guest target is stored in GITC 103d. In one embodiment, when a branch instruction is identified as a guest indirect branch instruction, this way can be used to select a predicted guest target $G_{tp}$ from the set associative GITC 103d as is shown in FIG. 1F. In one embodiment, the predicted guest target $G_{tp}$ can be forwarded to native/guest target mapping table 122 and its validity determined by comparing the predicted guest target $G_{tp}$ to the current guest target mapping in native/guest target mapping table 122.

Loop Managing Subsystem

Figure 1G:
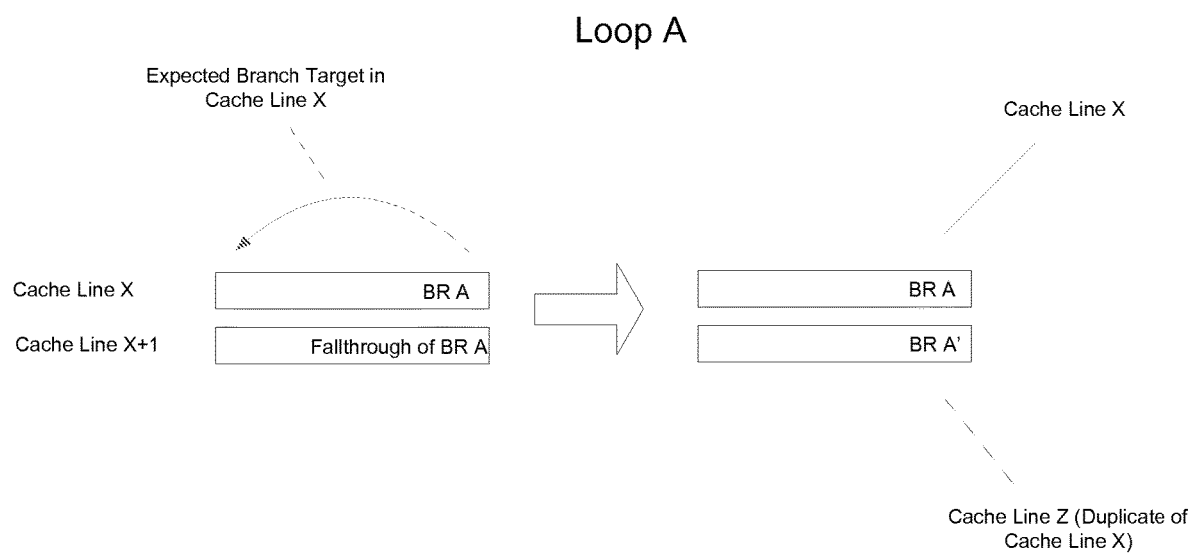
FIG. 1G illustrates system operation when a loop-back branch instruction whose target is located in the same cache line in which it resides is encountered according to one embodiment.

In one embodiment, to maximize cache line forwarding where small loops are encountered, pre-decoded bits can be stored that indicate that although two consecutive cache lines, cache line X and cache line X+1, can be forwarded, the next instruction fetch is expected to be to the same cache-line as shown in FIG. 1G. In one embodiment, system 101B determines if a branch instruction BR A of a first cache line X is dynamically taken (e.g., is successively taken) and replicates cache line X if it is determined that the branch instruction BR A of cache line X is indeed dynamically taken as is shown in FIG. 1G. In such cases, cache line X and the duplicated cache line (e.g., cache line Z in FIG. 1G) are selected to be forwarded together. And, a loop exit branch instruction tag table (discussed herein in detail below) is used to predict the direction of the second instance of branch instruction BR A, BR A', that is located in the duplicated cache line. Thus, in one embodiment, regardless of the direction of BR A, two cache-lines of instructions can be processed and forwarded to the scheduler (either cache line X and cache line X+1 which contains the fall through of BR A or cache line X and duplicate cache line Z which contains BR A' as is shown in FIG. 1G).

In a wide architecture that is able to forward two cache lines every clock cycle, the two instances of the backward branch, namely, BR A and BR A' (the instances in the first cache line and the duplicated cache line) can be fetched at the same time. A component that is used in branch prediction, a Global History Shift Register (GHSR), is an m-bit shift register that records the direction (taken or not taken) of the last m branch instructions that are encountered by the processor. It should be appreciated that because a GHSR is updated once at the end of each cycle, a direction prediction (a prediction regarding whether a branch instruction is taken or not taken) for both BR A and BR A' may be made by a branch predictor using the same GHSR content. Because of this, if BR A' is the exit branch of the loop, the loop exit may be mis-predicted because of the reliance of the branch prediction logic on a GHSR that corresponds to taken branch, BR A, in making the prediction. This type of mis-prediction is avoided if BR A is the exit branch of the loop.

Figure 1H:
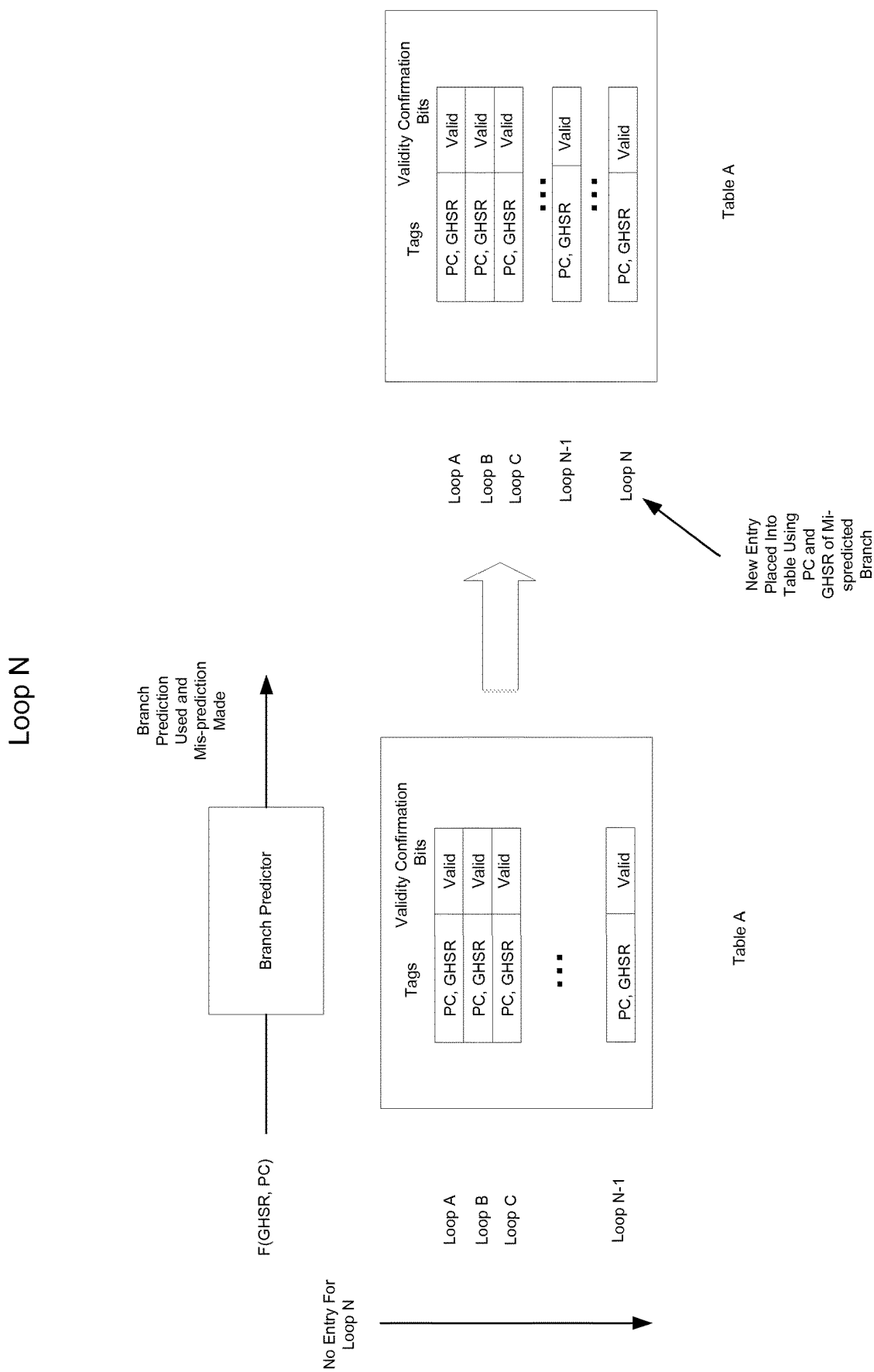
FIG. 1H illustrates the operation of an exemplary loop exit instruction tag table A according to one embodiment.

In one embodiment, in order to avoid mis-predictions of the type discussed above, a table (as alluded to above) is used that includes data that enables the direct identification of exit branch instructions that otherwise can be mis-predicted. FIG. 1H shows an example of such a table, Table A (a loop exit branch instruction tag table). FIG. 1H illustrates the operation of Table A, which maintains entries, that correspond to respective loops A-N, and that include respective tags that are used to identify the exit instruction for the loops. The tags that are stored in Table A are a combination of the PC (e.g., program counter) bits and the GHSR content that correspond to loop exit branch instructions. In one embodiment, a validity confirmation bit for each table entry is stored in Table A to confirm whether a table entry is valid. In one embodiment, any suitable replacement policy (e.g., pseudo-least-recently-used) can be used to maintain Table A. In one embodiment, during a fetch, the processor front end can indicate that a branch instruction is the second instance of a loop-back branch instruction (e.g., branch instruction BR A' in the foregoing example) that is being fetched that cycle (as was discussed with reference to FIG. 1G). A bit that identifies the second instance of the loop-back branch instruction can then be stored during the lifetime of the branch. If the second instance loop-back branch instruction is thereafter mis-predicted, as taken, and a bit identifying the second instance loop-back branch instruction is set (and there is no entry in Table A for the branch), the PC and GHSR information corresponding to the loop-back branch instruction (which is then known as corresponding to the loop exit branch instruction based on its mis-prediction as being taken) is inserted into Table A (see FIG. 1H; tag for loop N). In one embodiment, "exclusive or" logic can be used to compress the PC and GHSR information.

In one embodiment with PC and GHSR information stored as tags in Table A that correspond to second instance loop-back branch instructions, Table A can be accessed during fetch operations to correct the direction of mis-predicted second instance loop-back branch instructions. A hit in Table A means that the direction of a branch should be corrected from taken to not taken (to exit the loop) even if the branch predictor predicts that the direction is taken (a hit in Table A overrides the branch predictor).

Figure 1I:
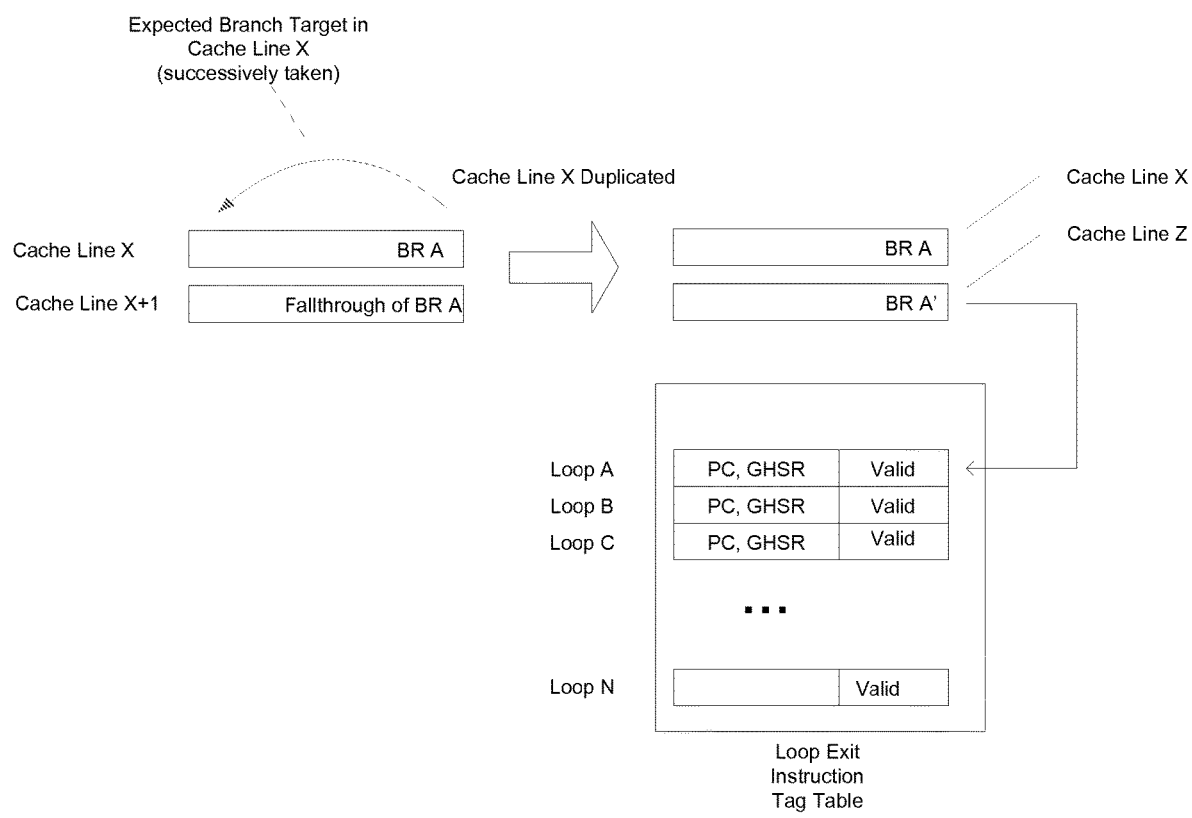
FIG. 1I shows the duplication of a cache line and the forwarding of the cache line and the duplicate cache line according to one embodiment.

In summary, referring to FIG. 1I, as a part of its operation, system 101B, responsive to a request to fetch a cache line X that includes a branch instruction BR A, determines if BR A is to be successively executed as a part of a loop. If it is determined that BR A is to be successively executed, system 101B creates a duplicate of the cache line X, cache line Z, that includes a branch BR A' and forwards both cache line X and cache line Z as is shown in FIG. 1I. As a part of determining whether branch BR A' is a taken or not taken branch, system 101B, determines if BR A' has a PC value and a GHSR pattern and that matches that of a PC value and a GHSR pattern of an exit branch instruction tag that is stored in Table A as shown in FIG. 1I (such as the tag that corresponds to Loop A). If branch BR A' has a PC value and GHSR pattern that matches that of a PC Value and GHSR pattern of an exit branch instruction tag that is stored in Table A, the loop is exited (cache line X and cache line X+1 containing the fall-through branch of BR A are forwarded). However, if branch BR A' does not have a PC value and GHSR pattern that matches that of a PC value and GHSR pattern of an exit branch instruction tag that is stored in Table A, cache line X and its duplicate cache line Z are again forwarded, and the above described cache line duplicating, forwarding and exit branch identifying operations are repeated.

In one embodiment, because the content of table A can be configured to be valid for up to a predetermined maximum number of iterations per loop, a saturation check can be performed before a pattern is inserted into the table. For example, for a loop GHSR having a maximum number iterations of 0xfff, a false positive hit can occur for instances of the loop greater than 12 because all iterations of the loop greater than 12 will see a value of 0xfff in GSHR and match the contents of the table. This can cause a misidentification of a branch as an exit branch. Accordingly, a saturation check of GHSR should be performed before insertion of data into Table A. In one embodiment, in addition to the previously described features, system 101B can include loop unrolling logic to save space in the shadow cache.

Operation

Figure 1J:
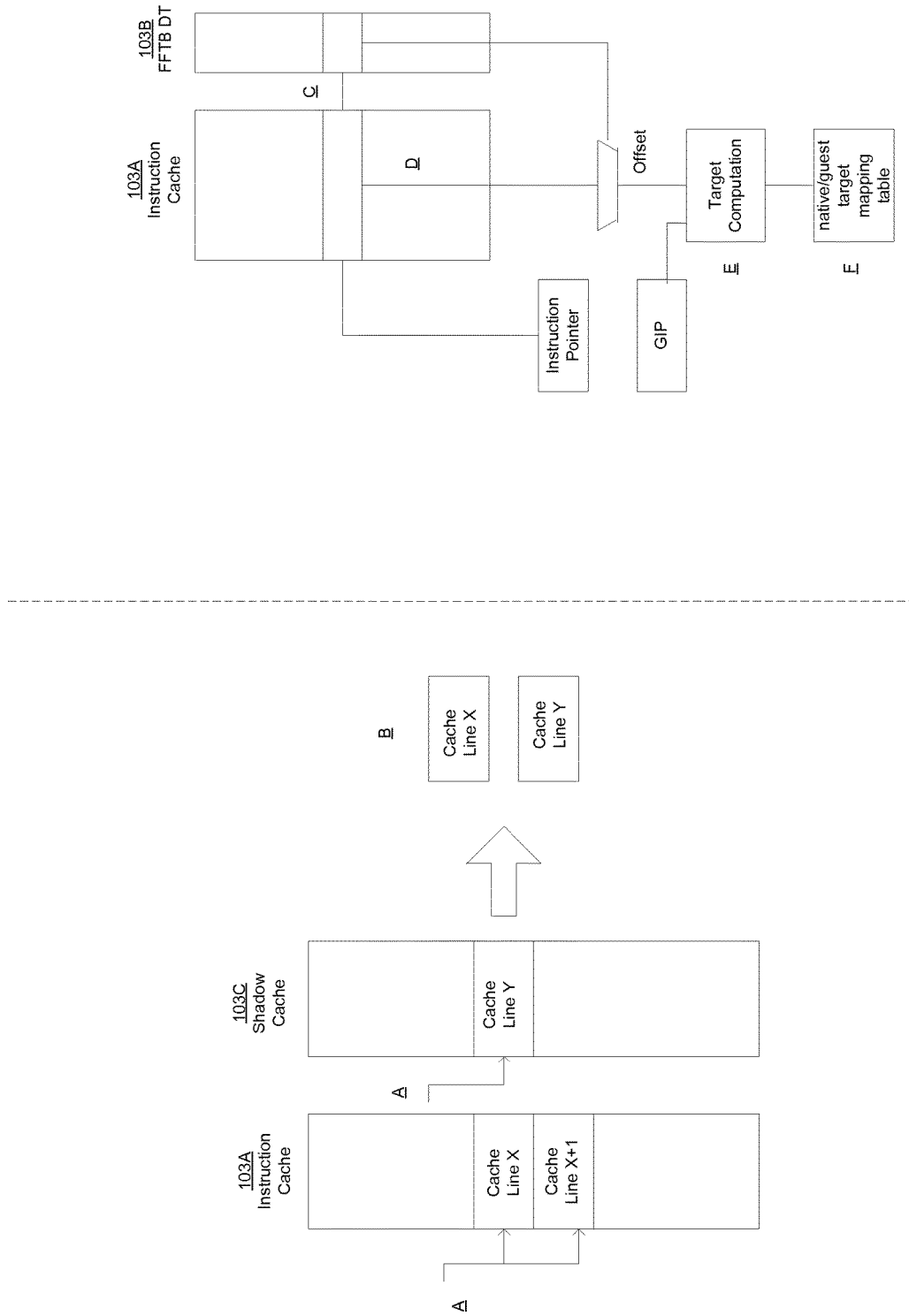
FIG. 1J illustrates operations performed by a system for supporting wide and efficient front-end operation with guest-architecture emulation according to one embodiment according to one embodiment.
Figure 1K:
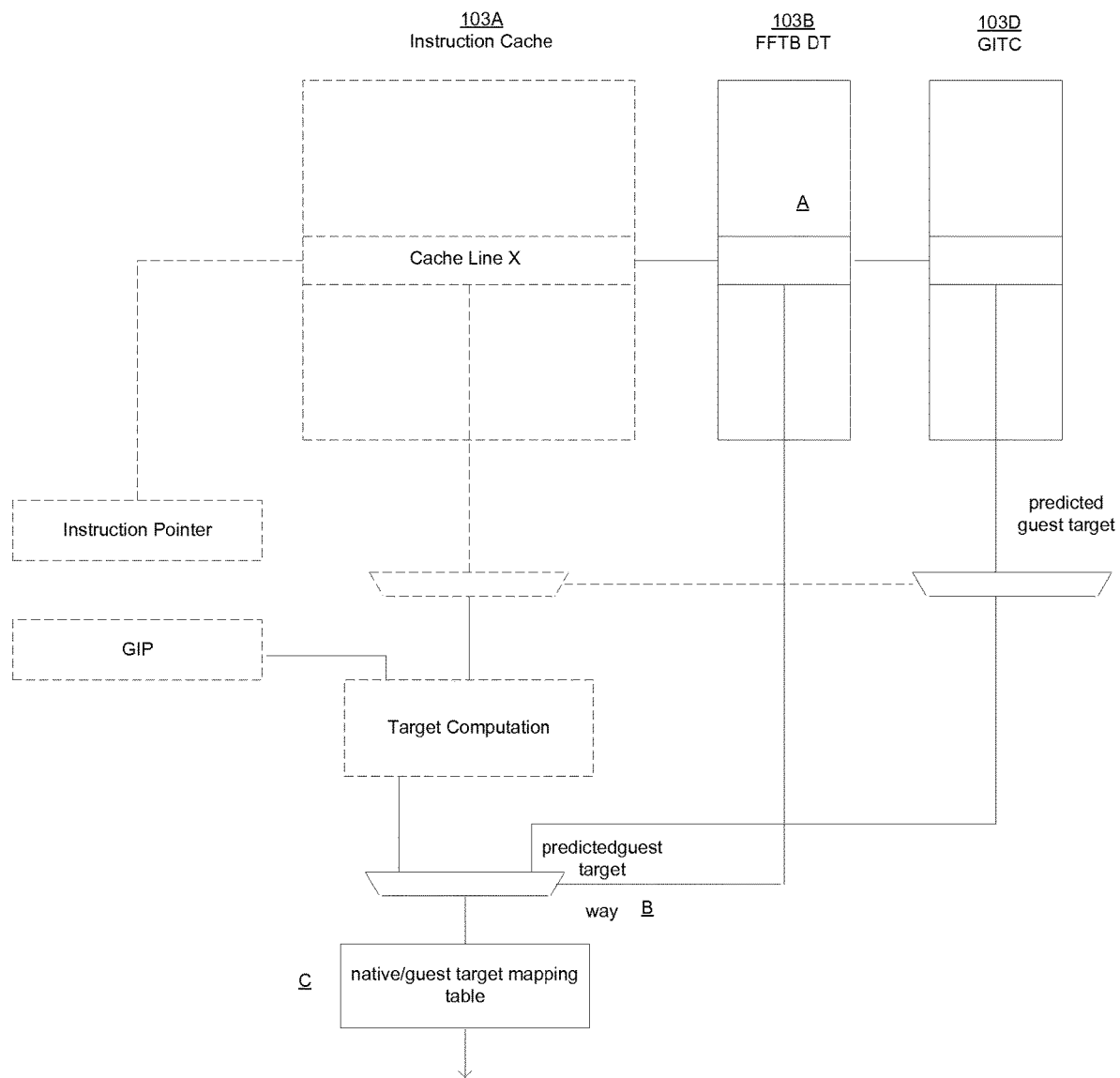
FIG. 1K illustrates target verification operations performed by a system for supporting wide and efficient front-end operation with guest-architecture emulation when a guest indirect branch is encountered according to one embodiment according to one embodiment.
Figure 1L:
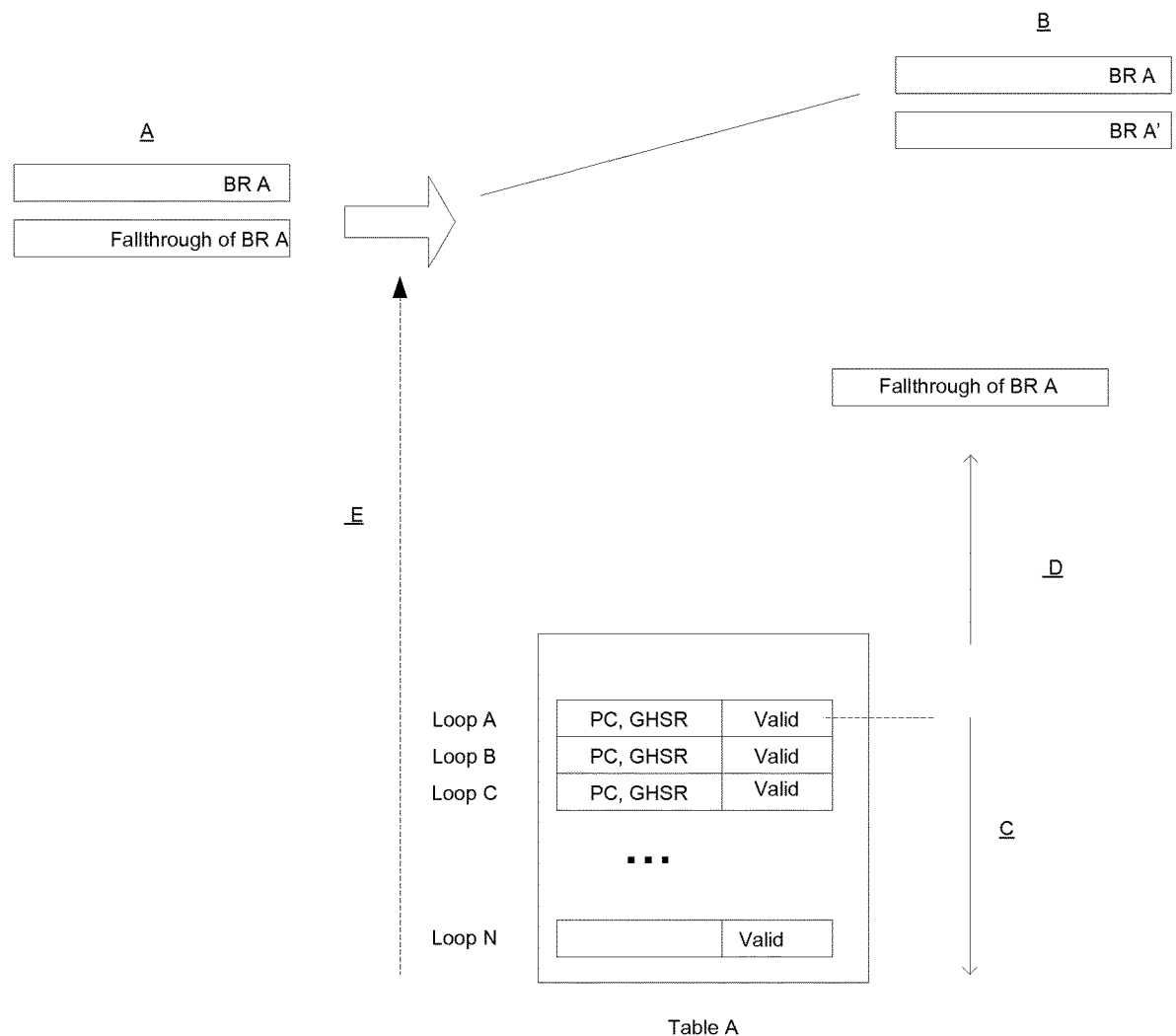
FIG. 1L illustrates operations performed by a system for supporting wide and efficient front-end operation with guest-architecture emulation when a loop is encountered according to one embodiment according to one embodiment.

FIGS. 1J-1L illustrates operations performed by system 101 for supporting wide and efficient front-end operation with guest-architecture emulation according to one embodiment. These operations, which relate to wide and efficient front-end operation with guest-architecture emulation are only exemplary. It should be appreciated that other operations not illustrated by FIGS. 1J-1L can be performed in accordance with one embodiment.

First Far Taken Branch Managing Operations (Direct)

Referring to FIG. 1J, at A, system 101A, upon receipt of a request to fetch a first far taken branch, reads a first cache line (cache line X) that includes a first far taken branch, a next cache line (cache line X+1) and a cache line (cache line Y) that is stored at a target address in instruction cache 103A and is copied to an index of shadow cache 103C.

At B, system 101A fetches the first cache line and either the next cache line or the cache line located in shadow cache 103C based on information accessed from the FFTB DT 103*b*. In the FIG. 1J example, at B, cache line X and non-consecutive cache line Y (the cache line that is stored at the branch target and in shadow cache 103C) are fetched. Thus, in the FIG. 1J example, information is accessed from FFTB DT 103*b* that indicates that cache line Y as opposed to cache line X+1 is to be fetched.

The requirement of providing high throughput in an emulated architecture leads to complex data paths (such as are presented by far taken branches and loops). To address this, in one embodiment, the frontend can be required to decode both guest and native branch instructions. The guest branches can then be used to calculate the guest targets and to lookup a native/guest target mapping table to obtain native targets that can be cached in FFTB DT 103*b*. In one embodiment, data from FFTB DT 103*b* can be used to select a FFTB from which information can be obtained to compute a guest target. In one embodiment, the cached native target and the computed guest target can be validated by comparing them to data in the native/guest target mapping table as is described below in operations C-F.

At C, system 101A, determines the offset of a first far taken branch of the first cache line (cache line X) in instruction cache 103*a* from FFTB DT 103*b*. In one embodiment, the offset of the first far taken branch is data that is pre-decoded and stored in the FFTB DT 103B.

At D, system 101A extracts the offset of the target instruction relative to the first far taken branch from the first cache line.

At E, system 101A computes a guest target value based on the offset of the target instruction and a value that is associated with the guest instruction pointer. The computed guest target and the cached native target are provided to native/guest target mapping table such that a comparison with the mapping that is maintained therein can be made (see below).

At F, system 101A compares the computed guest target address and the cached native target address (cache in FFTB DT 103*b* in FIG. 1A) with the current operating system mapping of the guest target address and the native target address present in the native/guest target address mapping table (e.g., 122 in FIG. 1F) to determine if the computed guest target address and the cache native target address are valid.

First Far Taken Branch Managing Operations (Indirect)

Referring to FIG. 1K, at A, information from FFTB-DT 103*b* is used to identify a branch instruction as a guest indirect branch instruction and to identify the way in which a predicted guest target address is stored in GITC 103*d*. In one embodiment, GITC 103*d* can be a part of L1 cache 103.

At B, the way is used to select the predicted guest target address from the set associative GITC 103*d*.

At C, the validity of the predicted guest target is determined by comparing the predicted guest target value to a value that is stored in the native/guest target mapping table.

Loop Managing Operations

In one embodiment, as discussed herein, a bit that identifies the second instance of a loop-back branch instruction can be stored during the lifetime of a branch. Thus, if a second instance loop-back branch is mis-predicted and the bit identifying the second instance loop-back branch is set (and there is no entry in Table A that corresponds to the second instance loop-back branch), the PC and GHSR information corresponding to the branch is inserted into Table A. Operations A-E of FIG. 1L illustrate operations that occur subsequent to an entry for a branch being placed into Table A.

Referring to FIG. 1L at A, system 101B, responsive to a request to fetch branch instruction BR A of cache line X, determines if branch instruction BR A is to be successively executed as a part of a loop (e.g., determines if the branch is dynamically taken).

At B, if branch instruction BR A is to be successively executed system 101B creates a duplicate of cache line X, cache line Z, and forwards cache line X and cache line Z as is shown in FIG. 1L.

At C, as a part of determining whether branch instruction BR A' of duplicate cache line Z is a taken or not taken branch instruction, system 101B, determines if BR A' has a PC value and GHSR pattern that matches that of a stored instruction tag of Table A (see FIG. 1L) that identifies the exit branch (not taken branch) associated with the loop.

At D, if branch instruction BR A' has a PC value and GHSR pattern that matches that of the stored instruction tag that identifies the exit branch instruction of the loop, the loop is exited (e.g., and cache line X+1 containing the fall-through of BR A is forwarded).

At E, if branch instruction BR A' does not have a PC value and GHSR pattern that matches that which identifies the exit branch instruction of the loop, then operations B-E are repeated as needed.

Figure 2:
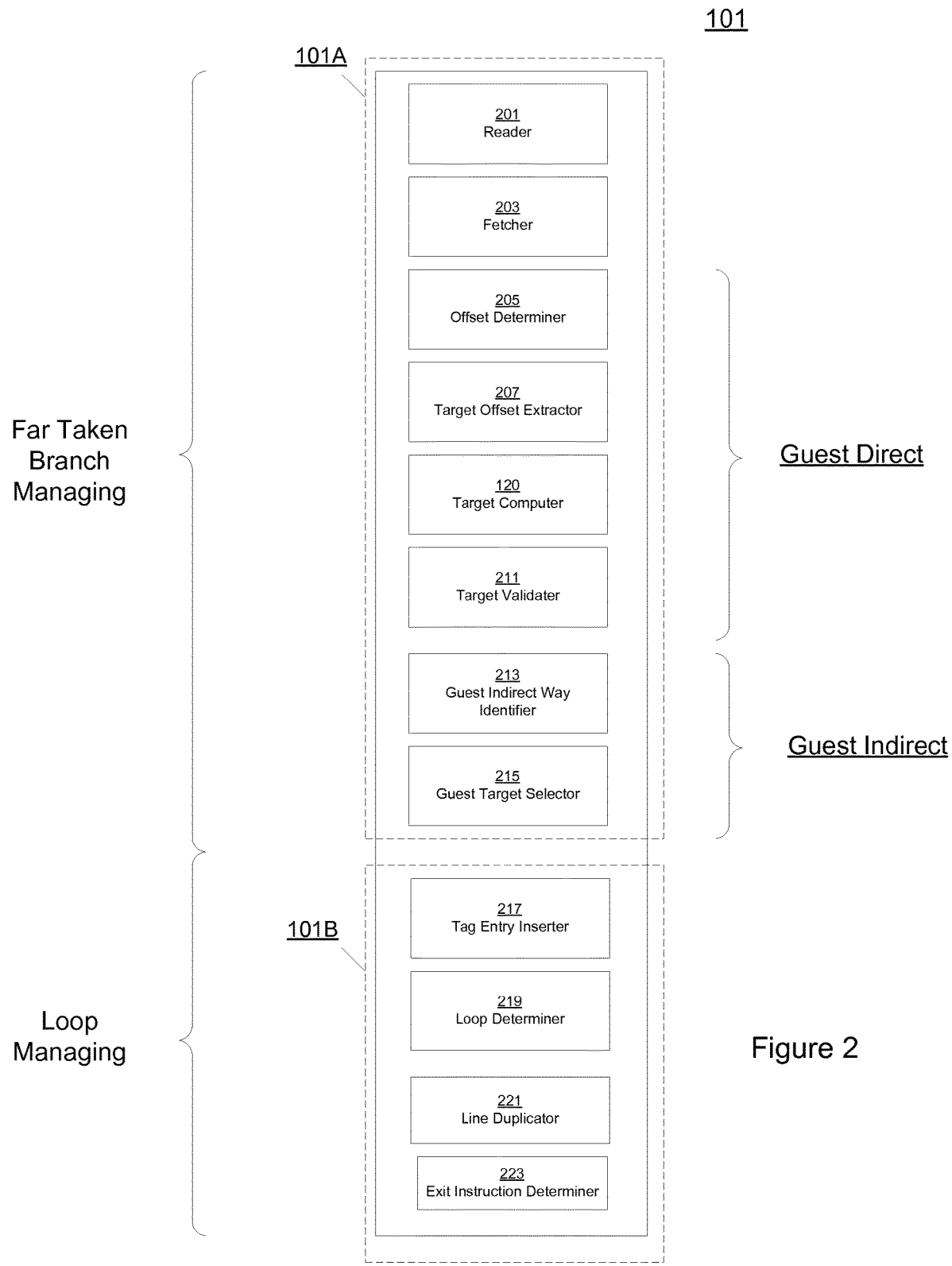
FIG. 2 shows components of a system for supporting wide and efficient front end operation with guest architecture emulation according to one embodiment.

Components of System for Supporting Wide and Efficient Front-End Operation with Guest-Architecture Emulation According to One Embodiment FIG. 2 shows components of a system 101 for supporting wide and efficient front end operation with guest architecture emulation according to one embodiment. In one embodiment, components of system 101 implement an algorithm for wide and efficient front end operation with guest architecture emulation. In the FIG. 2 embodiment, components of subsystem 101A include read request reader 201, fetcher 203, offset determiner 205, target offset extractor 207, target computer 120, target validator 211, guest indirect branch/GITC way identifier 213 and guest target selector 215.

First Far Taken Branch Managing Components

Reader 201 reads a first cache line that includes a first far taken branch instruction (e.g., the fetch pc), a next cache line (e.g., the cache line after the fetch pc) and a cache line stored in a shadow cache upon receiving a request to fetch a first far taken branch instruction. In one embodiment, in every clock cycle, when the instruction cache is accessed for the fetch_pc, three cache lines are read and two are selected to be forwarded (see discussions made herein with reference to FIGS. 1A-1D).

Fetcher 203 fetches the first cache line (e.g., the fetch_pc) and either the next cache line (e.g., a consecutive cache line) or a cache line in the shadow cache (e.g., a non-consecutive cache line) that is located at an index of the shadow cache that corresponds to the index of the instruction cache in which the first cache line is located. In one embodiment, when the cache line that corresponds to the current fetch_pc is fetched, information that is accessed from the FFTB DT (e.g., pre-decoded bits) is used to determine whether the two consecutive cache lines or the two non-consecutive cache lines are processed. In one embodiment, the shadow cache is accessed by the set of the fetch_pc but tagged by the target of the first far taken branch (see discussions made herein with reference to FIGS. 1A-1D).

Offset determiner 205 determines an offset of the first far taken branch in the first cache line. In one embodiment, offset determiner 205 determines the offset of the first far taken branch by accessing this information from the FFTB DT (e.g., 103b in FIG. 1A).

Target offset extractor 207 extracts a target offset from the first far taken branch of the first cache line. In one embodiment, a multiplexor can be used in the implementation of target offset extractor 207. In one embodiment the multiplexer selects the target offset and outputs the target offset to target computer 120. In other embodiments other components can be used in the implementation of target extractor 207.

Target computer 120 computes a guest target based on the target offset and a guest instruction pointer. In one embodiment, target computer 209 can be implemented as is described in commonly assigned U.S. patent application Ser. No. 13/360,024, filed on Jan. 27, 2012, to Mohammad Abdallah et al., entitled "Hardware Acceleration Components for Translating Guest Instructions to Native Instructions", which is incorporated by reference herein in its entirety.

Target validator 211 determines whether the computed guest target is valid based on an existing mapping of the guest target to a native target that is stored in a native/guest target mapping table (122 in FIG. 1F). In one embodiment, the determination is made by comparing a cached native target address (e.g., from FFTB DT 103b in FIG. 1A) and the computed guest target address with the information that is stored in the native/guest target mapping table (122 in FIG. 1F).

First Far Taken Branch Managing Components (Indirect)

Guest indirect branch/GITC way identifier 213 determines if a branch instruction is a guest indirect branch instruction and identifies the way in a guest-indirect-target cache (e.g., GITC 103d in FIG. 1F) in which a predicted guest target is stored. In one embodiment, the guest indirect branch/GITC way identifier 213 can determine whether a branch instruction is indirect or not by accessing an indicator of such in a first far taken branch data table (e.g., FFTB DT 103b in FIG. 1A).

Guest target selector 215 selects a predicted guest target from a set associative guest-indirect-target cache (e.g., GITC 103d in FIG. 1F). In one embodiment, a multiplexor can be used in the implementation of guest target selector 215. In one embodiment the multiplexer can select the guest target address from the guest-indirect-target cache (e.g., GITC 103d in FIG. 1F), based on the way that is identified by indirect guest branch/GITC way identifier 213, and outputs the predicted guest target for forwarding to a native/guest target mapping table. Using the native/guest target mapping table, the validity of the predicted guest target can be determined.

Loop Managing Components

In the FIG. 2 embodiment, components of subsystem 101B include loop exit branch instruction tag entry inserter 217, loop determiner 219, line duplicator 221, and exit instruction determiner 223.

Referring to FIG. 2, loop exit branch instruction tag entry inserter 217 inserts tags into placeholders of a loop exit branch instruction table (e.g., Table A in FIG. 1H) that identify the exit instructions that correspond to respective loops. As discussed herein, if a second instance loop-back branch is mis-predicted and a bit identifying the branch as a second instance loop-back branch is set (and there is no entry in Table A that corresponds to the second instance loop back branch), loop exit branch instruction tag entry inserter 217 inserts the PC and GHSR information that corresponds to the branch into the loop exit branch instruction tag table (e.g., Table A in FIG. 1H).

Loop determiner 219 determines if a branch instruction is to be successively executed as a part of a loop. In one embodiment, the determination can be made in response to a request to fetch a branch instruction of a first cache line.

Line duplicator 221 creates a duplicate of the first cache line and forwards the first cache line and the duplicate of the first cache line if the branch instruction is determined to be successively executed.

Exit instruction determiner 223 determines if a branch instruction that is included in the cache line that is a duplicate of the first cache line (e.g., the second instance loop-back instruction) has characteristics that correspond to a stored instruction tag that identifies an exit branch (not taken branch) associated with the loop. In particular, if the second instance loop-back instruction has a PC value and GHSR pattern that matches that of a PC value and GHSR pattern that are a part of a stored instruction tag that identifies the exit branch instruction of the loop, the loop is exited. However, if the second instance loop-back branch instruction does not have a PC value and GHSR pattern that matches that of a PC value and GHSR pattern that are part of a stored instruction tag, the first cache line and its duplicate are again forwarded.

It should be appreciated that the aforementioned components of system 101 can be implemented in hardware, software, firmware or in some combination thereof. In one embodiment, components and operations of system 101 can be encompassed by components and operations of one or more computer components or programs (e.g., a cache controller 105). In another embodiment, components and operations of system 101 can be separate from the aforementioned one or more computer components or programs but can operate cooperatively with components and operations thereof. In one embodiment, subsystems 101A and 101B of system 100 can be provided together as a part of an integrated system. In other embodiments, each of subsystems 101A and 101B can be made, used and function separately and independently of the other. Additionally, although specific components are disclosed in the FIG. 2 diagram, such components are exemplary. That is the present embodiment can have various other components or variations of the components shown in the diagram.

Figure 3A:
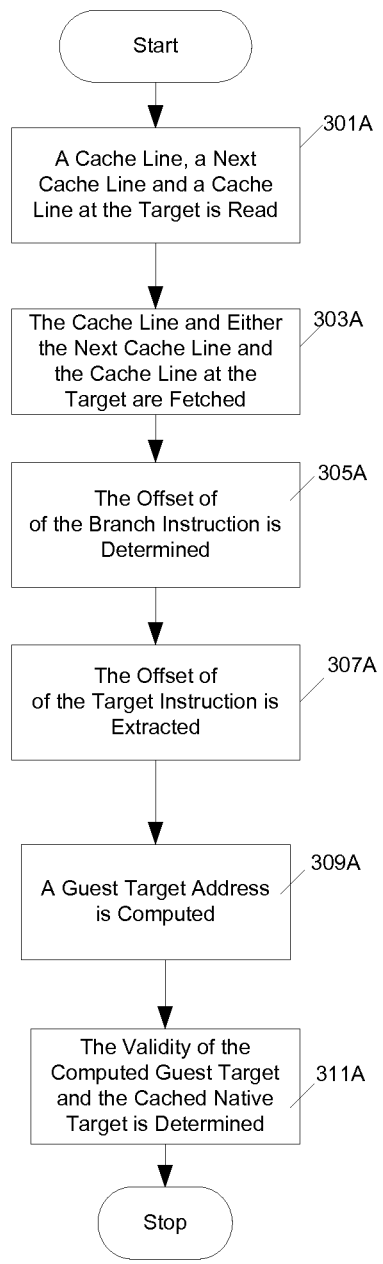
FIG. 3A shows a flowchart of the method that is used when a first far taken branch is requested according to one embodiment.
Figure 3B:
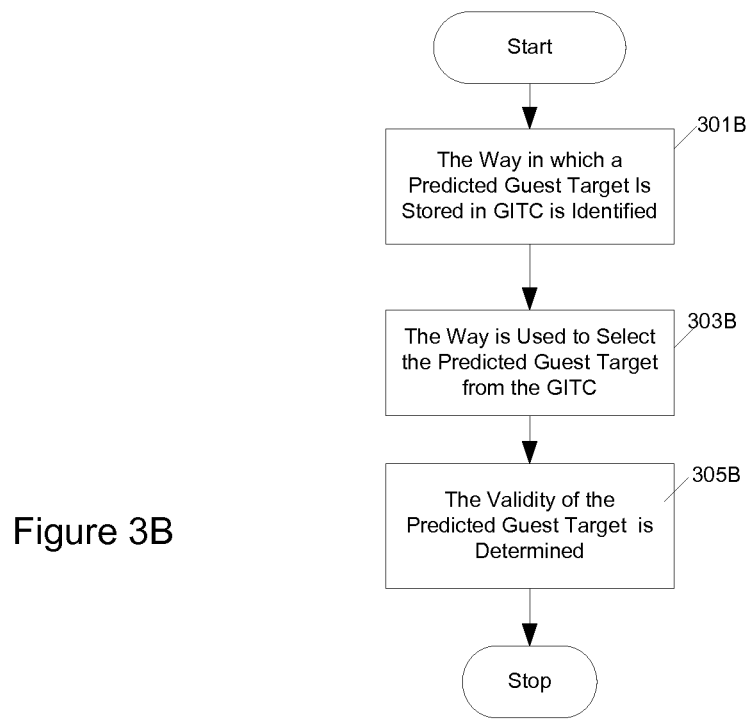
FIG. 3B shows a flowchart of the method that is used when a guest branch instruction is not a function of the position of the current guest instruction pointer according to one embodiment.
Figure 4:
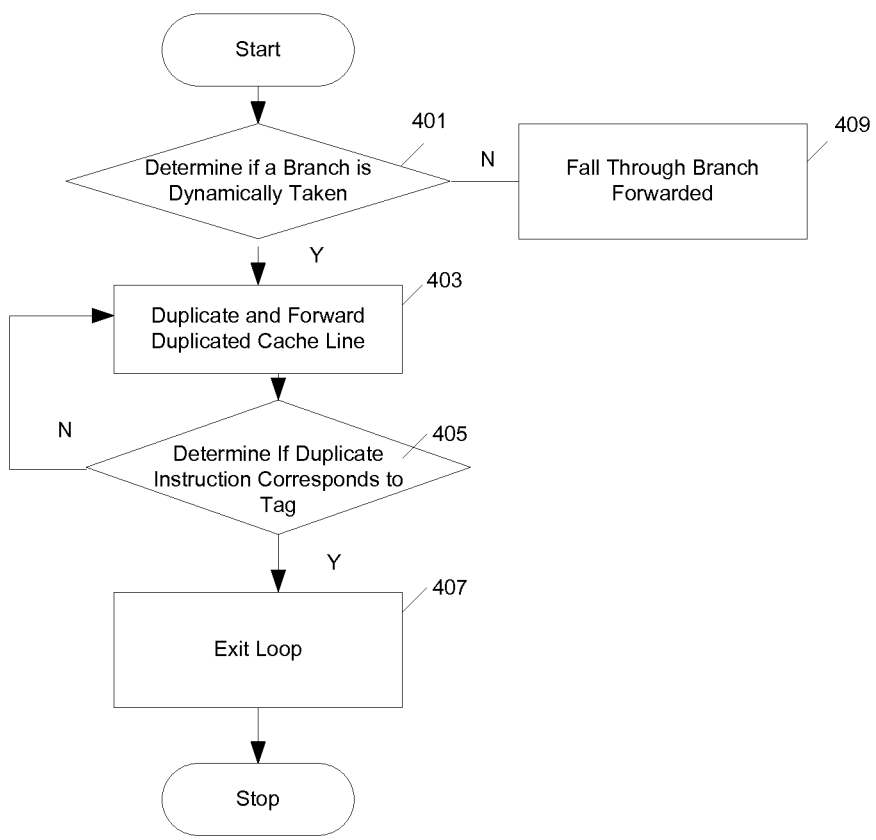
FIG. 4 shows a flowchart of the method that is used when a loop is encountered according to one embodiment.

Method for Supporting Wide and Efficient Front-End Operation with Guest-Architecture Emulation According to One Embodiment According to One Embodiment FIGS. 3A, 3B and 4 show flowcharts 300A, 300B and 400 of steps performed in exemplary methods that are a part of a method for wide and efficient front end operation with guest architecture emulation according to one embodiment. The flowcharts include processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowcharts.

FIG. 3A shows a flowchart of the method that is used when the fetching of a first far taken branch instruction is requested.

Referring to FIG. 3A, at 301A, in response to a request to fetch a first far taken branch instruction of a first cache line, the first cache line, the next cache line and a cache line located at the branch target (that has a copy stored in a shadow cache) is read.

At 303A, the first cache line and either the next cache line or the copy of the cache line stored in the shadow cache is fetched based on information accessed from the FFTB DT (e.g., 103B in FIG. 1A).

At 305A, in order to confirm that the cached branch target is valid, the offset of the first far taken branch in the first cache line is determined based on information accessed from the FFTB DT (e.g., 103B in FIG. 1A).

At 307A, a target offset is extracted from the first far taken branch of the first cache line (see FIG. 1E).

At 309A, a guest target address is computed based on the target offset and a guest instruction pointer (see FIG. 1E) and is forwarded along with the cached native target address to the native/guest target mapping table.

At 311A, it is determined whether a computed guest target address and the cached native target address are valid by comparing them with the native/guest target addresses that are stored in the native/guest target mapping table (see FIG. 1E).

FIG. 3B shows a flowchart of the method used when a guest branch instruction is not a function of the current guest instruction pointer (e.g., the guest branch is a guest indirect branch) and an additional caching structure, a guest indirect target cache (GITC), is used to store a predicted guest target of the guest indirect branch instruction.

Referring to FIG. 3B, at 301B, information from a data table (e.g., FFTB-DT 103b in FIG. 1A) is used to identify a branch instruction as a guest indirect branch instruction and to identify the way in which a predicted guest target is stored in the GITC (e.g., 103d in FIG. 1F).

At 303B, the way is used to select the predicted guest target that is stored in the set associative GITC (e.g., 103d in FIG. 1F).

At 305B, the validity of the predicted guest target is determined based on the mapping of the guest target to the native target in the native/guest target mapping table.

FIG. 4 shows a flowchart of the method that is used when a loop is encountered. In one embodiment, as discussed herein, prior to the method sequence described below, PC and GHSR information corresponding to the exit branch instruction of the loop encountered is inserted into Table A. Operations A-E of FIG. 1L illustrate operations that occur subsequent to an entry for a branch being placed into Table A.

Referring to FIG. 4, at 401 responsive to a request to fetch a branch instruction of a first cache line, it is determined if the branch instruction is to be successively executed as a part of a loop. If it is determined that the branch instruction is not to be successively executed, the first cache line and a cache line that includes a fall through branch are forwarded at 409.

At 403, a duplicate of the first cache line is made and the first cache line and the duplicate of the first cache line are forwarded (if the branch instruction is determined to be successively executed).

At 405, it is determined if a duplicate branch instruction that is contained by the duplicate cache line has a PC value and a GHSR pattern that corresponds to a PC value and GHSR pattern that are a part of a stored instruction tag that identifies an exit branch instruction (a not taken branch) associated with the loop.

At 407, if the duplicate branch instruction has a PC value and GHSR pattern that corresponds to a PC value and GHSR pattern that are a part of a stored instruction tag that identifies an exit branch instruction (not taken branch) associated with the loop, the loop is exited.

However, if the duplicate branch instruction does not have a PC value and GHSR pattern that corresponds to a PC value and GHSR pattern that are a part of a stored instruction tag that identifies an exit branch instruction (not taken branch) associated with the loop, 403 is repeated.

With regard to exemplary embodiments thereof, methods for supporting wide and efficient front-end operation with guest architecture emulation are disclosed. As a part of a method for supporting wide and efficient front-end operation, upon receiving a request to fetch a first far taken branch instruction, a cache line that includes the first far taken branch instruction, a next cache line and a cache line located at the target of the first far taken branch instruction is read. Based on information accessed from a data table, the cache line and either the next cache line or the cache line located at the target is fetched in a single cycle.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A processor, comprising:
   a cache system, comprising:
      a cache controller to:
         fetch, a first cache line that includes a branch instruction and, based on information in a data table, either a second cache line that is adjacent to the first cache line in the instruction cache or a target cache line that is stored at a target address of the branch instruction,
         wherein the information is populated in the data table upon moving the first cache line from an L2 cache to an L1 cache,
         wherein the cache controller is to copy the target cache line to a shadow cache and the target cache line is fetched from the shadow cache, and
         wherein the shadow cache has a same number of sets and half a number of ways as the instruction cache.

2. The processor of claim 1, wherein the information in the data table is separate from the first cache line, including an indication of the target address in the cache line.

3. The processor of claim 1, wherein the target cache line is stored in a same index of the shadow cache as is the first cache line in the instruction cache.

4. The processor of claim 1, wherein the controller is to determine an offset of a target instruction in the target cache line relative to the branch instruction, compute a guest target based on said offset of said target instruction and a guest instruction pointer, and determine whether said guest target and a cached native target are valid based on a reference to a conversion-lookaside-buffer.

5. The processor of claim 1, wherein the controller to select a predicted guest target from a guest target cache that stores guest targets and determine whether the predicted guest target is valid based on a reference to a conversion-lookaside-buffer.

6. The processor of claim 1, wherein the information includes one or more of a branch instruction address of the branch instruction, an offset associated with the target cache line, a direct/indirect branch instruction identifier, and a native/guest branch instruction identifier.

7. A cache system, comprising:
   a cache controller to:
      fetch, a first cache line that includes a branch instruction and, based on information in a data table, either a second cache line that is adjacent to the first cache line in the instruction cache or a target cache line that is stored at a target address of the branch instruction,
      wherein the information is populated in the data table upon moving the first cache line from an L2 cache to an L1 cache,
      wherein the cache controller is to copy the target cache line to a shadow cache and the target cache line is fetched from the shadow cache, and
      wherein the shadow cache has a same number of sets and half a number of ways as the instruction cache.

8. The cache system of claim 7, wherein the information in the data table is separate from the first cache line, including an indication of the target address in the cache line.

9. The cache system of claim 7, wherein the target cache line is stored in a same index of the shadow cache as is the first cache line in the instruction cache.

10. The cache system of claim 7, wherein the controller is to determine an offset of a target instruction in the target cache line relative to the branch instruction, compute a guest target based on said offset of said target instruction and a guest instruction pointer, and determine whether said guest target and a cached native target are valid based on a reference to a conversion-lookaside-buffer.

11. The cache system of claim 7, wherein the controller to select a predicted guest target from a guest target cache that stores guest targets and determine whether the predicted guest target is valid based on a reference to a conversion-lookaside-buffer.

12. The cache system of claim 7, wherein the information includes one or more of a branch instruction address of the branch instruction, an offset associated with the target cache line, a direct/indirect branch instruction identifier, and a native/guest branch instruction identifier.

13. A non-transitory machine-readable storage medium that stores instructions, which when executed by a processor, causes the processor to:
    fetch, a first cache line that includes a branch instruction and, based on information in a data table, either a second cache line that is adjacent to the first cache line in an instruction cache or a target cache line that is stored at a target address of the branch instruction, wherein the information is populated in the data table upon moving the first cache line from an L2 cache to an L1 cache, and
    copy the target cache line to a shadow cache and the target cache line is fetched from the shadow cache,
    wherein the shadow cache has a same number of sets and half a number of ways as the instruction cache.

14. The non-transitory machine-readable storage medium of claim 13, wherein the information in the data table is separate from the first cache line, including an indication of the target address in the cache line.

15. The non-transitory machine-readable storage medium of claim 13, wherein the target cache line is stored in a same index of the shadow cache as is the first cache line in the instruction cache.

16. The non-transitory machine-readable storage medium of claim 13, wherein the controller is to determine an offset of a target instruction in the target cache line relative to the branch instruction, compute a guest target based on said offset of said target instruction and a guest instruction pointer, and determine whether said guest target and a cached native target are valid based on a reference to a conversion-lookaside-buffer.

17. The non-transitory machine-readable storage medium of claim 13, wherein the information includes one or more of a branch instruction address of the branch instruction, an offset associated with the target cache line, a direct/indirect branch instruction identifier, and a native/guest branch instruction identifier.

* * * * *